US009752012B2

(12) United States Patent
Aso

(10) Patent No.: US 9,752,012 B2
(45) Date of Patent: Sep. 5, 2017

(54) CARBON-FIBER-PRECURSOR ACRYLIC FIBER BUNDLE WITH OIL COMPOSITION ADHERING THERETO, PROCESS FOR PRODUCING THE SAME, OIL COMPOSITION FOR CARBON-FIBER-PRECURSOR ACRYLIC FIBER, AND OIL COMPOSITION DISPERSION FOR CARBON-FIBER-PRECURSOR ACRYLIC FIBER

(75) Inventor: Hiromi Aso, Otake (JP)

(73) Assignee: Mitsubishi Chemical Corporation, Tokyo (JP)

( * ) Notice: Subject to any disclaimer, the term of this patent is extended or adjusted under 35 U.S.C. 154(b) by 416 days.

(21) Appl. No.: 14/002,263

(22) PCT Filed: Mar. 1, 2011

(86) PCT No.: PCT/JP2011/054580
§ 371 (c)(1),
(2), (4) Date: Aug. 29, 2013

(87) PCT Pub. No.: WO2012/117514
PCT Pub. Date: Sep. 7, 2012

(65) Prior Publication Data
US 2013/0338281 A1 Dec. 19, 2013

(51) Int. Cl.
| | | |
|---|---|---|
| *B60C 1/00* | (2006.01) | |
| *C08K 5/544* | (2006.01) | |
| *D06M 15/327* | (2006.01) | |
| *D01F 9/22* | (2006.01) | |
| *D01F 11/06* | (2006.01) | |

(Continued)

(52) U.S. Cl.
CPC ............ *C08K 5/544* (2013.01); *B05D 3/0254* (2013.01); *C08K 5/12* (2013.01); *D01F 9/22* (2013.01); *D01F 11/06* (2013.01); *D06M 13/224* (2013.01); *D06M 15/327* (2013.01); *D06M 15/6436* (2013.01); *D01F 6/18* (2013.01); *D01F 6/38* (2013.01); *D06M 15/3568* (2013.01); *D06M 2101/28* (2013.01)

(58) Field of Classification Search
CPC ........ D01F 9/22; D01F 6/18; D06M 2101/40; D06M 2101/28; D06M 15/356; D06M 15/3568; D06M 15/327
USPC ....................................................... 524/287
See application file for complete search history.

(56) References Cited

U.S. PATENT DOCUMENTS

| | | | | | |
|---|---|---|---|---|---|
| 4,880,881 A | * | 11/1989 | Minami | .................. | D01F 11/14 523/205 |
| 5,783,305 A | * | 7/1998 | Masaki | ..................... | D01F 9/22 428/375 |

(Continued)

FOREIGN PATENT DOCUMENTS

| | | |
|---|---|---|
| JP | 2000 199183 | 7/2000 |
| JP | 2002 266239 | 9/2002 |

(Continued)

OTHER PUBLICATIONS

International Search Report Issued Jun. 7, 2011 in PCT/JP11/54580 Filed Mar. 1, 2011.

(Continued)

*Primary Examiner* — Jane L Stanley
(74) *Attorney, Agent, or Firm* — Oblon, McClelland, Maier & Neustadt, L.L.P.

(57) ABSTRACT

The present invention relates to a carbon-fiber-precursor acrylic fiber bundle with an oil composition adhering thereto, wherein the oil composition comprises an amino-modified silicone, an aromatic ester compound (1) having a structure represented by the following formula (1), and an aromatic ester compound (2) having a structure represented by the following formula (2), the amino-modified silicone, the aromatic ester compound (1), and the aromatic ester compound (2) meet the specific requirements, the process for producing the same, an oil composition carbon-fiber-precursor acrylic fiber, and an oil composition dispersion for carbon-fiber-precursor acrylic fiber.

[Chem 1]

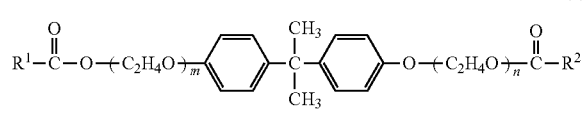

(1)

[Chem 2]

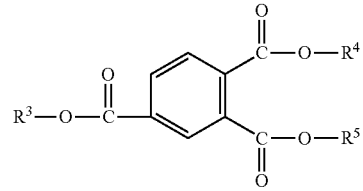

(2)

[Chem 3]

(Continued)

-continued

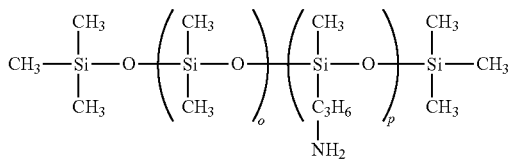

(3)

13 Claims, No Drawings

(51) Int. Cl.
*D06M 13/224* (2006.01)
*D06M 15/643* (2006.01)
*B05D 3/02* (2006.01)
*C08K 5/12* (2006.01)
*D06M 15/356* (2006.01)
*D06M 101/28* (2006.01)
*D01F 6/18* (2006.01)
*D01F 6/38* (2006.01)

(56) References Cited

U.S. PATENT DOCUMENTS

| | | | | |
|---|---|---|---|---|
| 6,641,915 B1* | 11/2003 | Kasabo | ............ | D01F 9/22 264/182 |
| 8,932,711 B2* | 1/2015 | Aso | ............ | D06M 7/00 252/8.84 |
| 2009/0263576 A1 | 10/2009 | Okabe et al. | | |
| 2010/0247911 A1 | 9/2010 | Aso et al. | | |
| 2014/0134094 A1* | 5/2014 | Aso | ............ | D06M 13/224 423/447.4 |

FOREIGN PATENT DOCUMENTS

| | | |
|---|---|---|
| JP | 2003 055881 | 2/2003 |
| JP | 2004 149937 | 5/2004 |
| JP | 2004 169198 | 6/2004 |
| JP | 2004-197272 A | 7/2004 |
| JP | 2004-211240 A | 7/2004 |
| JP | 2005 264361 | 9/2005 |
| JP | 2005 264384 | 9/2005 |
| JP | 2008 063705 | 3/2008 |
| JP | 2008 196097 | 8/2008 |
| JP | 2010 053467 | 3/2010 |
| JP | 2011 042916 | 3/2011 |
| WO | WO 97/09474 A1 | 3/1997 |
| WO | 2007 066517 | 6/2007 |
| WO | 2009 060834 | 5/2009 |

OTHER PUBLICATIONS

Extended European Search Report issued Jan. 2, 2014 in Patent Application No. 11859873.9.
Office Action issued on Jun. 24, 2014 in the corresponding Japanese Application No. 2011-512328 (with English Translation).

* cited by examiner

CARBON-FIBER-PRECURSOR ACRYLIC FIBER BUNDLE WITH OIL COMPOSITION ADHERING THERETO, PROCESS FOR PRODUCING THE SAME, OIL COMPOSITION FOR CARBON-FIBER-PRECURSOR ACRYLIC FIBER, AND OIL COMPOSITION DISPERSION FOR CARBON-FIBER-PRECURSOR ACRYLIC FIBER

TECHNICAL FIELD

The present invention relates to a carbon-fiber-precursor acrylic fiber bundle with an oil composition adhering thereto, a process for producing the same, an oil composition for carbon-fiber-precursor acrylic fiber, and an oil composition dispersion for carbon-fiber-precursor acrylic fiber.

BACKGROUND ART

There has been known a method for producing a carbon fiber bundle, including heat-treating a carbon-fiber-precursor acrylic fiber bundle in an oxygen atmosphere at 200° C. to 400° C. to convert it into a flameproofed fiber bundle (flameproofing step) followed by carbonizing the flameproofed fiber bundle in an inert atmosphere at 1000° C. or higher to obtain the carbon fiber bundle (carbonization step). The carbon fiber bundle obtained by this method is widely used industrially, particularly as a reinforcing fiber for composite materials because of its excellent mechanical properties.

However, in this method for producing a carbon fiber bundle, a fusion may occur between single fibers in the flameproofing step, leading to process failure, such as fluffing and bundle breakage in the flameproofing step and the subsequent carbonization step. (The flameproofing step and the carbonization step are hereinafter also referred to comprehensively as the "calcination step.") As a method to prevent the fusion between single fibers in the flameproofing step, application of an oil composition on the surface of the carbon-fiber-precursor acrylic fiber bundle (oil composition application treatment) is known, and a large number of oil compositions have been studied.

As an oil composition, silicone-based oils containing a silicone as the main component have been generally used. As a silicone, modified silicones that have reactive groups, such as amino, epoxy, and polyether, are generally used because of their compatibility with and retention on a carbon-fiber-precursor acrylic fiber bundle.

However, upon heating, modified silicone-based oils tend to become highly viscous because of progression of cross-linking reaction, and the resulting viscous material tends to accumulate on the surfaces of the fiber conveying rollers and guides that are used in the after treatment (such as the drying step) of the carbon-fiber-precursor acrylic fiber bundle with an oil composition adhering thereto and the flameproofing step. Thus, the carbon-fiber-precursor acrylic fiber bundle with an oil composition adhering thereto or the flameproofed fiber bundle may be entwined or tangled around the fiber conveying rollers and guides, causing process failure, such as bundle breakage and leading to decreased operability.

In addition, silicone-based oils that have been applied to the carbon-fiber-precursor acrylic fiber bundle tend to produce silicon compounds, such as silicon oxides, silicon carbides, and silicon nitrides, in the calcination step. Production of silicon compounds is known to lead to a low industrial productivity and a low product quality.

Thus, oil compositions with a lower content of silicone have been proposed with the aim of reducing the silicone content of the carbon-fiber-precursor acrylic fiber bundle with an oil composition adhering thereto. For example, an oil composition with reduced silicone content has been proposed that contains 40 to 100 wt % of an emulsifying agent containing 50 to 100 wt % of a polycyclic aromatic compound (see Patent Document 1).

In addition, an oil composition with reduced silicone content has also been proposed that contains 80 to 95% by mass of a higher fatty acid ester product on both sides of an ethylene oxide and/or propylene oxide adduct of bisphenol A (see Patent Document 2). An oil composition with a reduced silicone content has also been proposed that contains a product of reaction of a saturated aliphatic dicarboxylic acid and a mono-alkyl ester of an ethylene oxide and/or propylene oxide adduct of bisphenol A (see Patent Document 3).

An oil composition has also been proposed that combines a heat-resistant resin with a residual rate of 80% by mass or more after heating in air at 250° C. for 2 hours and silicone (see Patent Document 4).

Furthermore, an oil composition has also been proposed that contains 10% by mass or more of a compound having a reactive functional group and no silicone compound or that contains a silicone compound in a quantity within the range of 2% by mass in terms of the mass of silicon (see Patent Document 5).

On the other hand, an oil composition with lower silicone content has been proposed that contains a compatibilizing agent with the aim of increasing the affinity of the silicone-based compounds and the non-silicone-based compounds towards each other to mix them (see Patent Documents 6 and 7).

An oil composition has recently been proposed that contains as essential components an ester compound having at least 3 ester groups in the molecule and a silicone-based compound (see Patent Document 8). In the oil composition, the silicone content is reduced by the use of an ester compound. In addition, both the prevention of fusion between single fibers and a stable operation can be achieved simultaneously in the production of carbon fibers.

DOCUMENTS OF RELATED ART

Patent Documents

Patent Document 1: Japanese Unexamined Patent Publication (Kokai) No. 2005-264384
Patent Document 2: Japanese Unexamined Patent Publication (Kokai) No. 2002-266239
Patent Document 3: Japanese Unexamined Patent Publication (Kokai) No. 2003-55881
Patent Document 4: Japanese Unexamined Patent Publication (Kokai) No. 2000-199183

Patent Document 5: Japanese Unexamined Patent Publication (Kokai) No. 2005-264361
Patent Document 6: Japanese Unexamined Patent Publication (Kokai) No. 2004-149937
Patent Document 7: Japanese Unexamined Patent Publication (Kokai) No. 2004-169198
Patent Document 8: WO 07/066,517

DISCLOSURE OF INVENTION

Problems to be Solved by the Invention

The oil composition disclosed in Patent Document 1 is in the form of a stable emulsion because of its high content of an emulsifying agent. However, the carbon-fiber-precursor acrylic fiber bundle with this oil composition adhering thereto tends to be low in bundlability. Thus, the oil composition has problems that it is unsuitable for manufacturing at high production efficiency, and it is difficult to obtain carbon fiber bundles with excellent mechanical properties with this composition.

The oil compositions disclosed in Patent Documents 2 and 3 have an extremely high heat resistance because they are heat-resistant resins manufactured from bisphenol A-based aromatic esters. However, the compositions have problems that they are not sufficiently effective for preventing the fusion between single fibers, and it is difficult to obtain carbon fiber bundles with excellent mechanical properties on a stable basis with this composition.

The oil composition disclosed in Patent Document 4 forms a film on the surface of fibers at 250° C. to 300° C., and the film prevents diffusion of oxygen into the interior of fibers in the flameproofing step, inhibiting uniform flameproofing. As a result, this composition has a problem that it is difficult to obtain carbon fiber bundles with excellent mechanical properties on a stable basis with this composition. Furthermore, the oil composition disclosed in Patent Document 4 has problems that the oil composition or its denaturation substances accumulate in the furnace or the conveying roller in the flameproofing step because of it has a high heat resistance, leading to process failure.

The oil composition disclosed in Patent Document 5 can have increased oil adhesiveness by increasing the oil viscosity at 100° C. to 145° C. However, this composition occasionally causes process failure, such as entwining of the carbon-fiber-precursor acrylic fiber bundle with the oil composition adhering thereto around the fiber-conveying roller and the like, because it has a high viscosity, leading to decreased operability.

On the other hand, the oil compositions disclosed in Patent Documents 6 and 7, which contain compatibilizing agents, have a certain compatibilizing effect. However, the content of the compatibilizing agent is required to be at least 10% by mass because the agent has a low affinity towards silicone-based compounds. In addition, the decomposition product of the compatibilizing agent occasionally forms tar in the calcination step, causing process failure.

The precursor fiber to which the oil composition disclosed in Patent Document 8 is attached stabilizes operation. However, the bundlability of the bundle obtained from the fibers is insufficient in the flameproofing step because the heat resistance of the oil composition is low.

In addition, the oil compositions disclosed in Patent Document 8 tends to lead to the production of carbon fiber bundles that are lower in the mechanical properties than the bundles obtained with silicone-based oils containing silicone as the main component.

In conclusion, compared with silicone-based oils, the above-mentioned oil compositions with decreased silicone content tend to deteriorate the operability of the carbon-fiber-precursor acrylic fiber bundle with the oil composition adhering thereto, prevention of fusion, bundlability, and the mechanical properties of carbon fiber bundles. For these reasons, it is difficult to obtain high-quality carbon fiber bundles on a stable basis with this composition.

On the other hand, silicone-based oils, which have been widely used conventionally, have problems of decreased operability due to increased viscosity and decreased industrial productivity due to the production of silicon compounds.

In summary, the problems of decreases in operability and industrial productivity with oil compositions containing silicone as the main component and the problems of decreases in prevention of fusion, the bundlability of the carbon-fiber-precursor acrylic fiber bundle with the oil composition adhering thereto, and the mechanical properties of the carbon fiber bundle, which are associated with the oil compositions with a lowered silicone content, are two sides of the same coin, and simultaneous solution of all of the problems associated with both compositions has been impossible by conventional art.

Under the above-mentioned circumstances, the objective of the present invention is to provide an oil composition for carbon-fiber-precursor acrylic fiber and its dispersion that are capable of effectively preventing fusion between single fibers and suppressing a decrease in operability in the process of manufacturing the carbon fiber bundle, and producing, with a high productivity, a carbon-fiber-precursor acrylic fiber bundle with an oil composition adhering thereto that has a good bundlability and a carbon fiber bundle with an excellent mechanical properties; a carbon-fiber-precursor acrylic fiber bundle with an oil composition adhering thereto; and a process for producing the same.

Means for Solving the Problem

As a result of diligent studies, the inventors found that the above-mentioned problems with the oil composition containing silicone as the main component and the problems with the oil composition with decreased silicone content can be simultaneously solved by using aromatic ester compounds having different structures in combination and specifying the structures and ratios of these compounds. Thus, the inventors completed the present invention.

The carbon-fiber-precursor acrylic fiber bundle with an oil composition adhering thereto according to the present invention is characterized in that an amino-modified silicone, an aromatic ester compound (1) having a structure represented by the following formula (1), and an aromatic ester compound (2) having a structure represented by the following formula (2) meet the following requirements (a) to (c):

(a) The adhesion amount of the amino-modified silicone is 0.01 to 0.2% by mass relative to the mass of the dry fiber.

(b) The total adhesion amount of the aromatic ester compound (1) and the aromatic ester compound (2) is 0.4 to 1.2% by mass relative to the mass of the dry fiber.

(c) The ratio of the adhesion amounts of the aromatic ester compound (1) and the aromatic ester compound (2) (the aromatic ester compound (2)/the aromatic ester compound (1)) is 0.25 to 6.5.

[Chem 1]

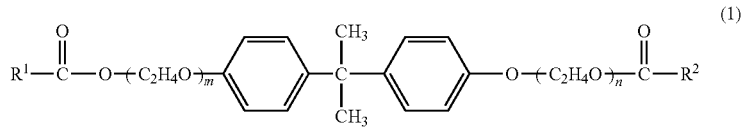

In formula (1), $R^1$ and $R^2$ each independently represents a hydrocarbon group having 7 to 21 carbon atoms, m and n are each independently from 1 to 5.

[Chem 2]

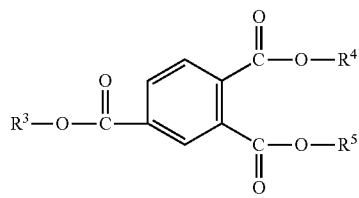

In formula (2), $R^3$ to $R^5$ each independently represents a hydrocarbon group having 8 to 14 carbon atoms.

The above-mentioned amino-modified silicone is preferably an amino-modified silicone having a structure represented by the following formula (3).

[Chem 3]

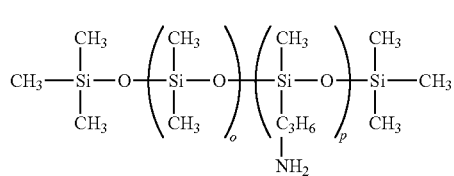

In formula (3), o is from 5 to 300, and p is from 1 to 5.

The above-mentioned amino-modified silicone preferably has a kinematic viscosity of 50 to 500 $mm^2/s$ at 25° C.

A block copolymerization polyether consisting of a propylene oxide unit and an ethylene oxide unit and having a structure represented by the following formula (4) is preferably further adhered in a quantity of 5 to 70 parts by mass relative to 100 parts by mass representing the total adhesion amount of the above-mentioned aromatic ester compound (1), the aromatic ester compound (2), and the amino-modified silicone relative to the mass of the dry fiber.

[Chem 4]

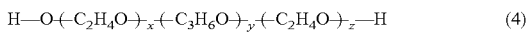

In formula (4), x, y, and z are each independently from 1 to 200.

The oil composition for carbon-fiber-precursor acrylic fiber according to the present invention is an oil composition for carbon-fiber-precursor acrylic fiber comprising an amino-modified silicone, an aromatic ester compound (1) having a structure represented by the following formula (1), and an aromatic ester compound (2) having a structure represented by the following formula (2), wherein the content of the above-mentioned amino-modified silicone is 1 to 25 parts by mass relative to 100 parts by mass representing the total quantity of the above-mentioned aromatic ester compound (1) and the aromatic ester compound (2), and the mass ratio of the above-mentioned aromatic ester compound (1) and the aromatic ester compound (2) (the aromatic ester compound (2)/the aromatic ester compound (1)) is 0.25 to 6.5.

[Chem 5]

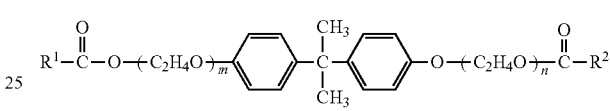

In formula (1), $R^1$ and $R^2$ each independently represents a hydrocarbon group having 7 to 21 carbon atoms, and m and n are each independently from 1 to 5.

[Chem 6]

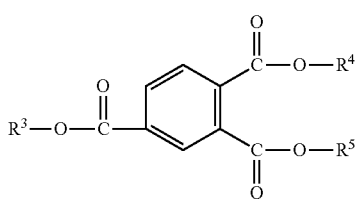

In formula (2), $R^3$ to $R^5$ each independently represents a hydrocarbon group having 8 to 14 carbon atoms.

The above-mentioned amino-modified silicone is preferably an amino-modified silicone having a structure represented by the following formula (3).

[Chem 7]

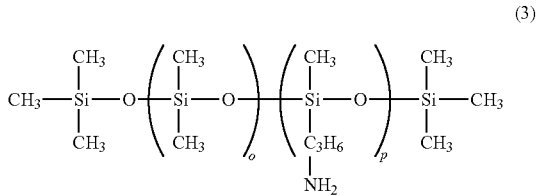

In formula (3), o is from 5 to 300, and p is 1 to 5.

The above-mentioned amino-modified silicone preferably has a kinematic viscosity of 50 to 500 $mm^2/s$ at 25° C.

The oil composition preferably further contains a block copolymerization polyether consisting of a propylene oxide unit and an ethylene oxide unit and having a structure represented by the following formula (4) in a quantity of 10 to 50 parts by mass relative to 100 parts by mass representing the total quantity of the above-mentioned amino-modified silicone, the aromatic ester compound (1), and the aromatic ester compound (2).

[Chem 8]

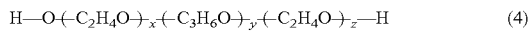

$$H-O(-C_2H_4O-)_x(-C_3H_6O-)_y(-C_2H_4O-)_z-H \quad (4)$$

In formula (4), x, y, and z are each independently from 1 to 200.

The oil composition dispersion for carbon-fiber-precursor acrylic fiber according to the present invention is characterized in that the above-mentioned oil composition for carbon-fiber-precursor acrylic fiber is dispersed in water or a solvent.

When the above-mentioned oil composition dispersion for carbon-fiber-precursor acrylic fiber is an emulsion, the above-mentioned oil composition for carbon-fiber-precursor acrylic fiber preferably forms micelles with an average particle size of 0.01 to 0.50 μm.

The process for producing the carbon-fiber-precursor acrylic fiber bundle with an oil composition adhering thereto according to the present invention includes a step of applying an oil composition dispersion for carbon-fiber-precursor acrylic fiber that is obtained by dispersing the above-mentioned oil composition for carbon-fiber-precursor acrylic fiber in water or a solvent to form micelles with an average particle size of 0.01 to 0.50 μm to a carbon-fiber-precursor acrylic fiber bundle in a water-swelled state and a step of drying densification of the carbon-fiber-precursor acrylic fiber bundle with the oil composition dispersion for carbon-fiber-precursor acrylic fiber applied thereto.

Effects of the Invention

The present invention can provide an oil composition for carbon-fiber-precursor acrylic fiber and its dispersion that can effectively prevent fusion between single fibers and suppress a decrease in operability in the process of manufacturing the carbon fiber bundle and produce, with a high productivity, a carbon-fiber-precursor acrylic fiber bundle with an oil composition adhering thereto that has a good bundlability and a carbon fiber bundle with an excellent mechanical properties; a carbon-fiber-precursor acrylic fiber bundle with an oil composition adhering thereto; and a process for producing the same.

In addition, since a decrease in operability can be suppressed, and the bundlability of the carbon-fiber-precursor acrylic fiber bundle with an oil composition adhering thereto is satisfactory according to the present invention, the present invention can increase the industrial productivity of the carbon fiber bundle and produce a high-quality carbon fiber bundle on a stable basis.

EMBODIMENTS OF THE INVENTION

The present invention is explained in detail below.

<Oil Composition for Carbon-Fiber-Precursor Acrylic Fiber>

The oil composition for carbon-fiber-precursor acrylic fiber according to the present invention (hereinafter also referred to as "oil composition") is applied to the after-mentioned carbon-fiber-precursor acrylic fiber bundle and contains aromatic ester compounds with different structure and an amino-modified silicone.

In this description, the carbon-fiber-precursor acrylic fiber bundle to which the oil composition of the present invention has not yet adhered is referred to as the "carbon-fiber-precursor acrylic fiber bundle" or the "precursor fiber bundle", and the carbon-fiber-precursor acrylic fiber bundle with an oil composition of the present invention adhering thereto is referred to as the "carbon-fiber-precursor acrylic fiber bundle with an oil composition adhering thereto" or the "precursor fiber bundle with an oil composition adhering thereto."

Aromatic ester compounds are effective in preventing fusion and giving bundlability in the flameproofing step for the after-mentioned carbon-fiber-precursor acrylic fiber bundle with an oil composition adhering thereto. In the present invention, an aromatic ester compound (1) having a structure represented by the following formula (1) and an aromatic ester compound (2) having a structure represented by the following formula (2) are used in combination as aromatic ester compounds.

[Chem 9]

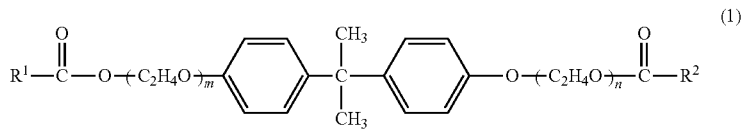

(1)

[Chem 10]

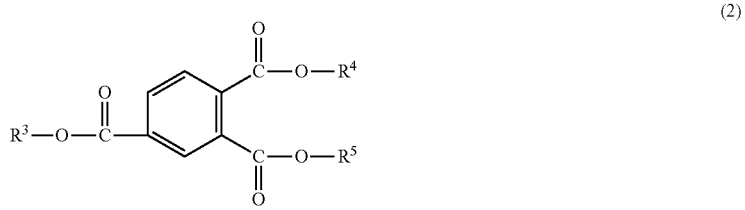

(2)

In formula (1), $R^1$ and $R^2$ each independently represents a hydrocarbon group having 7 to 21 carbon atoms. When the hydrocarbon group has 7 or more carbon atoms, the ester compound can maintain a good heat resistance, and therefore a sufficient fusion-prevention effect is obtained in the flameproofing step. On the other hand, when the hydrocarbon group has 21 or less carbon atoms, an emulsion of the oil composition containing the aromatic ester compound (1) can be easily prepared, leading to a uniform adhesion of the oil composition to the precursor fiber bundle. As a result, a sufficient fusion preventive effect is obtained in the flameproofing step, and at the same time the bundlability of the carbon-fiber-precursor acrylic fiber bundle with an oil composition adhering thereto is improved. The hydrocarbon group preferably has 9 to 15 carbon atoms.

$R^1$ and $R^2$ may have the same structure or separate structures.

The hydrocarbon group is preferably a saturated hydrocarbon group and more preferably a saturated chain hydrocarbon group. Specifically, the hydrocarbon group includes alkyl groups, such as the heptyl group, octyl group, nonyl group, decyl group, undecyl group, lauryl group (dodecyl group), tridecyl group, tetradecyl group, pentadecyl group, hexadecyl group, heptadecyl group, octadecyl group, nonadecyl group, icosyl group (eicosyl group), and henicosyl group (heneicosyl group).

Furthermore, in formula (1), m and n are each independently from 1 to 5. When the values of m and n are in the above-mentioned range, the aromatic ester compound (1) has a good heat resistance and can suppress fusion between single fibers in the flameproofing step.

The aromatic ester compound (1) represented by formula (1) may be a mixture of multiple compounds, and therefore m and n may not be integers. Moreover, the hydrocarbon groups that constitute $R^1$ and $R^2$ may be a single compound or a mixture of multiple compounds.

On the other hand, in formula (2), $R^3$ to $R^5$ each independently represents a hydrocarbon group having 8 to 14 carbon atoms. When the hydrocarbon group has 8 or more carbon atoms, the aromatic ester compound (2) can maintain a good heat resistance, and therefore a sufficient fusion-prevention effect is obtained in the flameproofing step.

On the other hand, when the hydrocarbon group has 14 or less carbon atoms, an emulsion of the oil composition containing the aromatic ester compound (2) can be easily prepared, leading to a uniform adhesion of the oil composition to the precursor fiber bundle. As a result, a sufficient fusion preventive effect is obtained in the flameproofing step, and at the same time, the bundlability of the carbon-fiber-precursor acrylic fiber bundle with an oil composition adhering thereto is improved. $R^3$ to $R^5$ are preferably a saturated hydrocarbon group having 8 to 12 carbon atoms from the viewpoint of ease of preparation of a uniform emulsion of the oil composition and are preferably a saturated hydrocarbon group having 10 to 14 carbon atoms from the viewpoint of excellent heat resistance in the presence of water vapor. R3 to R5 may have the same structure or separate structures.

The hydrocarbon group is preferably a saturated hydrocarbon group, such as a saturated chain hydrocarbon group and a saturated cyclic hydrocarbon group. Specifically, the hydrocarbon group includes alkyl groups, such as the octyl group, nonyl group, decyl group, undecyl group, lauryl group (dodecyl group), tridecyl group, and tetradecyl group.

The aromatic ester compound (1) having a structure represented by the above-mentioned formula (1) has a high heat resistance, is effective in maintaining the bundlability of the carbon-fiber-precursor acrylic fiber bundle with an oil composition adhering thereto until the flameproofing step is completed, and improves operability. However, the above-mentioned aromatic ester compound (1) remains in the fiber bundle until the carbonization step and, therefore, may deteriorate the mechanical properties of the carbon fiber.

On the other hand, the aromatic ester compound (2) having a structure represented by the above-mentioned formula (2) tends to be thermally decomposed or scattered and is unlikely to remain on the surface of the fiber bundle in the flameproofing step and, therefore, can maintain the high mechanical properties of the carbon fiber bundle. However, since the above-mentioned aromatic ester compound (2) is slightly poor in heat resistance, this substance alone cannot maintain the bundlability of the carbon-fiber-precursor acrylic fiber bundle with an oil composition adhering thereto in the flameproofing step.

Therefore, it is important in the present invention to use the aromatic ester compound (1) having a structure represented by the above-mentioned formula (1) and the aromatic ester compound (2) having a structure represented by the above-mentioned formula (2) in combination as the aromatic ester components.

The mass ratio of the aromatic ester compound (1) having a structure represented by the above-mentioned formula (1) and the aromatic ester compound (2) having a structure represented by the above-mentioned formula (2) (the aromatic ester compound (2)/the aromatic ester compound (1)) in the oil composition is 0.25 to 6.5. When the mass ratio is 0.25 or higher, a sufficient bundlability can be given to the carbon-fiber-precursor acrylic fiber bundle with an oil composition adhering thereto, and at the same time operability is improved. On the other hand, when the mass ratio is 6.5 or lower, a carbon fiber bundle with good mechanical properties is obtained. From the viewpoint of giving strength to the carbon fiber, the mass ratio is preferably 1.0 to 5 and more preferably 1.2 to 3.

The contents of the aromatic ester compound (1) having a structure represented by the above-mentioned formula (1) and the aromatic ester compound (2) having a structure represented by the above-mentioned formula (2) in the oil composition are not particularly limited as far as the mass ratio of both compounds is in the above-mentioned range. The content of the aromatic ester compound (1) is preferably 10 to 40% by mass in 100% by mass of the oil composition. When the content is 10% by mass or more, a sufficient bundlability can be given to the carbon-fiber-precursor acrylic fiber bundle with an oil composition adhering thereto, and at the same time operability is further improved. On the other hand, when the content is 40% by mass or less, a carbon fiber bundle with good mechanical properties is obtained. The content of aromatic ester compound (1) represented by the above-mentioned formula (1) is more preferably 15 to 30% by mass.

On the other hand, the content of aromatic ester compound (2) represented by the above-mentioned formula (2) is preferably 10 to 60% by mass in 100% by mass of the oil composition. When the content is 10% by mass or more, a carbon fiber bundle with good mechanical properties is obtained. On the other hand, when the content is 60% by mass or less, a sufficient bundlability can be given to the carbon-fiber-precursor acrylic fiber bundle with an oil composition adhering thereto. The content of aromatic ester compound (2) represented by the above-mentioned formula (2) is more preferably 40 to 55% by mass. In particular, when the content is more than 40% by mass, a carbon fiber bundle with further improved mechanical properties is obtained. Therefore, the content of aromatic ester compound (2) represented by the above-mentioned formula (2) is particularly preferably 45 to 50% by mass.

The oil composition according to the present invention contains an amino-modified silicone. Amino-modified silicones are compatible with the precursor fiber bundle and are effective in improving the affinity of the oil composition with the precursor fiber bundle and the heat resistance thereof.

The amino-modified silicone is preferably an amino-modified silicone having a structure represented by the following formula (3).

[Chem 11]

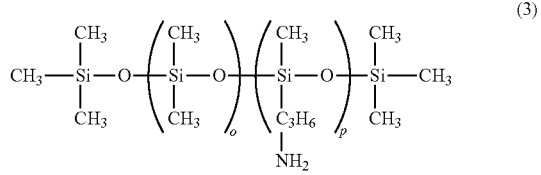

(3)

In formula (3), "o" is from 5 to 300, and "p" is from 1 to 5. When "o" and "p" are within the above-mentioned ranges, the carbon fiber bundle exhibits its capabilities well and has a heat resistance. In particular, when "o" is 5 or more, a good heat resistance can be obtained, and fusion between single fibers can be easily prevented. When o is 300 or less, the oil composition is well dispersed in water, and an emulsion can be easily prepared. In addition, the emulsion is stable and can be easily attached to the precursor fiber bundle uniformly.

On the other hand, when "p" is 1 or more, the oil composition has good affinity with the precursor fiber bundle, and therefore the fusion between single fibers can be effectively prevented. When "p" is 5 or less, the oil composition itself has a good heat resistance, and the fusion between single fibers can be easily prevented.

"o" is preferably 10 to 200, and "p" is preferably 1 to 3. The amino-modified silicone represented by formula (3) may be a mixture of multiple compounds. Therefore, "o" and "p" may not each be an integer.

"o" and "p" in formula (3) can be roughly estimated from the after-mentioned kinematic viscosity and amino equivalent of the amino-modified silicone.

"o" and "p" are determined by first measuring the kinematic viscosity of the amino-modified silicone and calculating the molecular weight from the measured value of the kinematic viscosity according to the A. J. Barry formula (log $\eta=1.00+0.0123 \, M^{0.5}$ [$\eta$, kinematic viscosity at 25° C.; M, molecular weight]). Then, from these molecular weight and amino equivalent, the number "p" of amino group per 1 molecule is determined. When the molecular weight and "p" are determined, the value of "o" can be determined.

The amino-modified silicone preferably has a kinematic viscosity of 50 to 500 mm²/s at 25° C. and an amino equivalent of 2000 to 6000 g/mol. When the kinematic viscosity is 50 mm²/s or higher, the oil composition has a good heat resistance, and the fusion between single fibers in the flameproofing step can be easily prevented. On the other hand, when the kinematic viscosity is 500 mm²/s or lower, an emulsion of the oil composition can be easily prepared. In addition, the emulsion of the oil composition is stable, and the oil composition can be easily attached to the precursor fiber bundle uniformly. As a result, the fusion between single fibers in the flameproofing step can be easily prevented, and a carbon-fiber-precursor acrylic fiber bundle with an oil composition adhering thereto with a good bundlability can be easily obtained. The kinematic viscosity is preferably 50 to 300 mm²/s at 25° C.

The kinematic viscosity of the amino-modified silicone is determined in accordance with JIS-Z-8803 or ASTMD445-46T by using, for example, an Ubbelohde-type viscometer.

The amino equivalent of the amino-modified silicone is preferably 2000 to 6000 g/mol and more preferably 4000 to 6000 g/mol from the viewpoint of compatibility with the precursor fiber bundle and the thermal stability of silicone. When the amino equivalent is 2000 g/mol or more, the number of amino group in 1 silicone molecule is not too large. As a result, the amino-modified silicone has a good thermal stability, and process failure can be easily prevented. On the other hand, when the amino equivalent is 6000 g/mol or lower, the number of amino group in 1 silicone molecule is sufficient. As a result, the compatibility between the amino-modified silicone and the precursor fiber bundle is good, and the oil composition can be easily attached uniformly. For this reason, a carbon-fiber-precursor acrylic fiber bundle with an oil composition adhering thereto can be easily obtained with little fusion between single fibers and a good bundlability.

The content of the amino-modified silicone is 1 to 25 parts by mass and preferably 8 to 15 parts by mass relative to 100 parts by mass representing the total quantity of the aromatic ester compound (1) having a structure represented by the above-mentioned formula (1) and the aromatic ester compound (2) having a structure represented by the above-mentioned formula (2). When the content of the amino-modified silicone is 1 part by mass or more, a carbon fiber bundle with good mechanical properties is obtained. On the other hand, when the content of the amino-modified silicone is 25 parts by mass or less, it is easy to prevent the problem that process failure due to silicon compounds that occurs in the flameproofing step and decreases industrial productivity.

It is unnecessary to add other components to the oil composition in the present invention as far as the oil composition can be uniformly applied to the precursor fiber bundle. However, depending on the equipment used to attach the oil composition to the precursor fiber bundle or the environment of usage, the oil composition according to the present invention may further contain other components, such as surfactants, compatibilizing agents, antistatic agents, antioxidants, and antimicrobial agents, for the purpose of improving operability or the stability or adhesion properties of the oil composition, as far as the effect of the present invention is not inhibited.

When the oil composition contains a surfactant, the oil composition can be easily dispersed in water or a solvent and can be easily applied to the precursor fiber bundle uniformly.

In the present invention, the solution in which the oil composition is dispersed in water or a solvent is referred to as the oil composition dispersion for carbon-fiber-precursor acrylic fiber (hereinafter also referred to as the "oil composition dispersion").

Surfactant:

As a surfactant, various known substances may be used, but nonionic surfactants are preferable.

The nonionic surfactants include, for example, polyethylene glycol type nonionic surfactants, such as ethylene oxide adducts of higher alcohols, ethylene oxide adducts of alkylphenols, aliphatic ethylene oxide adducts, ethylene oxide adducts of aliphatic esters of polyhydric alcohols, ethylene oxide adducts of higher alkylamines, ethylene oxide adducts of aliphatic amides, ethylene oxide adducts of fats and oils, and ethylene oxide adducts of polypropylene glycols; polyhydric alcohol type nonionic surfactants, such as aliphatic esters of glycerol, aliphatic esters of pentaerythritol, aliphatic esters of sorbitol, aliphatic esters of sorbitan, aliphatic esters of saccharose, alkyl ethers of polyhydric alcohols, and fatty amides of alkanolamines.

These surfactants may be used independently or in combination.

Of these surfactants, nonionic surfactants are preferably a block copolymerization polyether consisting of propylene oxide (PO) units and ethylene oxide (EO) units and having a structure represented by the following formula (4).

[Chem 12]

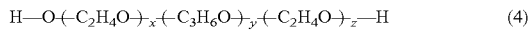  (4)

In formula (4), x, y, and z are each independently from 1 to 200, preferably 10 to 100.

In addition, the ratio of y and the sum of x and z, in other word, (x+z:y) is preferably 90:10 to 50:50.

The number-average molecular weight of the block copolymerization polyether is preferably 2000 to 10000. When the number-average molecular weight is within the above-mentioned range, the oil composition can have thermal stability and dispersibility in water, which are required as an oil composition, at the same time.

The block copolymerization polyether preferably has a kinematic viscosity at 100° C. of 10 to 500 $mm^2/s$. When the kinematic viscosity is within the above-mentioned range, excessive penetration of the oil composition into the interior of the fiber can be prevented, and at the same time such process failure is hard to occur as sticking and entwining of single fibers around the conveying rollers etc. due to the viscosity of the oil composition in the drying step after the oil composition is applied to the precursor fiber bundle.

The kinematic viscosity of the block copolymerization polyether can be determined in the same manner as the kinematic viscosity of the amino-modified silicone.

The content of the block copolymerization polyether consisting of PO units and EO units and having a structure represented by the above-mentioned formula (4) is preferably 10 to 50 parts by mass relative to 100 parts by mass representing the total quantity of the above-mentioned amino-modified silicone, aromatic ester compound (1), and the aromatic ester compound (2). When the content of the block copolymerization polyether is 10 parts by mass or more, the oil composition can be easily dispersed in water or a solvent, and the resulting oil composition dispersion is stable. On the other hand, when the content of the block copolymerization polyether is 50 parts by mass or less, occurrence of adhesion plaque on the fiber bundle due to frothing of the oil composition dispersion and the like can be easily suppressed without deteriorating the mechanical properties of the carbon fiber bundle. From the viewpoint of the strength development of the carbon fiber, the quantity of added block copolymerization polyether is more preferably 15 to 40 parts by mass and further more preferably 20 to 35 parts by mass.

Compatibilizing Agent;

Examples of a compatibilizing agent include a compatibilizing agent having a polydimethylsiloxane structure.

The content of the compatibilizing agent is preferably 1 to 10 parts by mass and more preferably 1 to 5 parts by mass relative to 100 parts by mass representing the total quantity of the above-mentioned amino-modified silicone, the aromatic ester compound (1), and the aromatic ester compound (2). When the content of the compatibilizing agent is 1 part by mass or more, the above-mentioned amino-modified silicone and the aromatic ester compounds (1) and (2) represented by the above-mentioned formula (1) and formula (2) are compatible, these components of the oil composition can uniformly adhere onto the surface of the fiber without uneven distribution when the oil composition is applied to the fiber. On the other hand, when the content of the compatibilizing agent is 10 parts by mass or less, evolution of silicon compounds derived from the polydimethylsiloxane structure of the compatibilizing agent in the calcination step is small, and problems leading to decreases in industrial productivity are hard to occur.

The compatibilizing agent is preferably a modified polydimethylsiloxane containing at least 1 unit selected from the group consisting of a unit represented by the following formula (5) and units represented by the following formulae (6), (7), and (8), and optionally a unit represented by the following formula (9).

[Cheme 13]

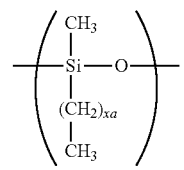  (5)

[Cheme 14]

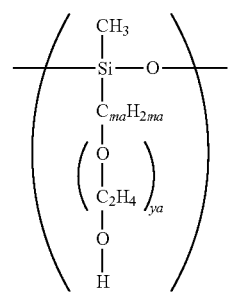  (6)

[Cheme 15]

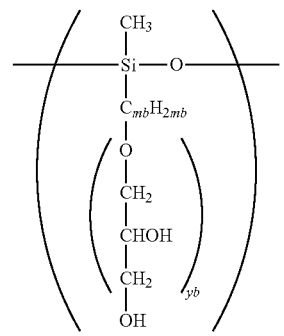  (7)

[Cheme 16]

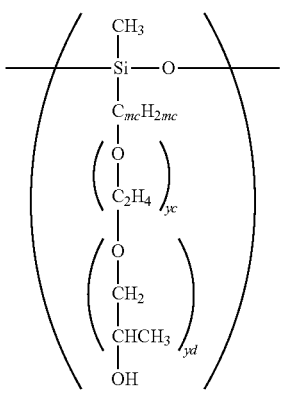

(8)

[Chem 17]

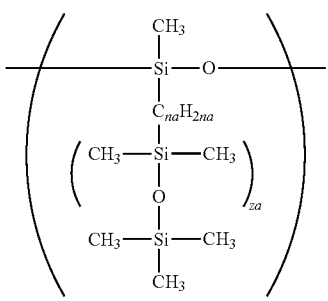

(9)

In formula (5), xa is from 7 to 15.
In formula (6), ma is from 0 to 3, and ya is from 5 to 15.
In formula (7), mb is from 0 to 3, and yb is from 1 to 5.
In formula (8), mc is from 0 to 3, yc+yd is from 5 to 15, and the ethylene oxide (EO) and the propylene oxide (PO) are a block copolymer or a random copolymer.
In formula (9), na is from 1 to 5, and za is from 3 to 60.

More preferred embodiments of the above-mentioned structure of the modified polydimethylsiloxane include the following 3 patterns, which are broad categories of the combinations of the above-mentioned units.

(Combination 1)

The above-mentioned modified polydimethylsiloxane preferably has at least 1 each of the units represented by the above-mentioned formulae (5), (6), and (9) and has a kinematic viscosity of 500 to 1000 mm$^2$/s at 25° C. (hereinafter referred to as "modified polydimethylsiloxane 1").

The alkyl chain of modified polydimethylsiloxane 1 is compatible with fats and oils. Because of the effects of this part, the above-mentioned modified polydimethylsiloxane 1 is dissolved in the amino-modified silicone and both of aromatic ester compounds (1) and (2) represented by the above-mentioned formula (1) and the above-mentioned formula (2), exhibiting compatibilizing effect. In the above-mentioned formula (5), xa of this alkyl chain is from 7 to 15. xa is preferably 11. When xa is 7 or more, modified polydimethylsiloxane 1 has good solubility in fats and oils. When xa is 15 or less, good stability is obtained when the oil composition is dispersed in water or a solvent.

The polyethylene oxide chain of modified polydimethylsiloxane 1 is compatible with water and stabilizes micelles when the oil composition is dispersed in water. With respect to the number of ethylene oxide in the polyethylene oxide chain, ya is from 5 to 15 in the above-mentioned formula (6).

Preferably, ya is 9. When ya is 5 or more, modified polydimethylsiloxane 1 has good affinity with water, and the stability of the emulsion is good. When ya is 15 or less, modified polydimethylsiloxane 1 has a good thermal stability. There may be alkyl groups between the polyethylene oxide and the polydimethylsiloxane. With respect to the range, ma is 0 to 3, preferably 0. When ma is 3 or less, modified polydimethylsiloxane 1 has a good dispersibility in water, and the resulting emulsion has good stability.

When modified polydimethylsiloxane 1 has a polydimethylsiloxyalkyl chain, the compound has a high solubility in the amino-modified silicone. The alkyl part of the polydimethylsiloxyalkyl chain is a saturated hydrocarbon in which na is from 1 to 5 in the above-mentioned formula (9). Preferably, na is 2. When na is 5 or less, modified polydimethylsiloxane 1 has a well-balanced solubility in the aromatic esters and the amino-modified silicone, thus exhibiting compatibilizing effect. The length of the polydimethylsiloxy part is determined by the total balance. Specifically, za in the above-mentioned formula (9) is in the range of 3 to 60, which is a value by which modified polydimethylsiloxane 1 has a kinematic viscosity ranging from 500 to 1000 mm$^2$/s at 25° C. Preferably, za is from 5 to 30. When the value of za is 3 or more, modified polydimethylsiloxane 1 has good solubility in the amino-modified silicone, exhibiting compatibilizing effect. When za is 60 or less, modified polydimethylsiloxane 1 does not have too high solubility in the amino-modified silicone, resulting in well-balanced compatibilization.

The number of each of the units represented by the above-mentioned formulae (5), (6), and (9) is preferably in the range of 2 to 5. When the number is within this range, the above-described capabilities of respective units are well-balanced, leading to good compatibilization ability. When the number of unit represented by each of the above-mentioned formulae (5), (6), and (9) is 2 or more, xa, ya, za, ma, and na may be the same or different between these units.

The above-mentioned modified polydimethylsiloxane 1 preferably has a kinematic viscosity of 500 to 1000 mm$^2$/s at 25° C., more preferably 600 to 800 mm$^2$/s. When the kinematic viscosity is 500 mm$^2$/s or more, the molecular weight of modified polydimethylsiloxane 1 is not too small, which allows the above-mentioned polyethylene oxide chain and alkyl chain to be uniformly introduced into the structure and improves thermal stability. On the other hand, when modified polydimethylsiloxane 1 has a kinematic viscosity of 1000 mm$^2$/s or lower, the oil composition is easily emulsified and the resulting emulsion will have good stability. In addition, it becomes easy to prevent a decrease in operability due to deposition of a highly viscous material on the drying rolls in the drying step after the oil composition is applied to the precursor fiber bundle.

The kinematic viscosity of modified polydimethylsiloxane 1 can be determined in the same manner as the kinematic viscosity of the amino-modified silicone.

(Combination 2)

The above-mentioned modified polydimethylsiloxane preferably has 1 to 20 each of the units represented by the above-mentioned formulae (5), (7), and (9) and a kinematic viscosity of 3000 to 5000 mm$^2$/s at 25° C. (hereinafter referred to as "modified polydimethylsiloxane 2").

The alkyl chain of modified polydimethylsiloxane 2 is compatible with fats and oils. Because of the effects of this part, modified polydimethylsiloxane 2 is dissolved in the amino-modified silicone and both of aromatic ester compounds (1) and (2) represented by the above-mentioned formula (1) and the above-mentioned formula (2), exhibiting compatibilizing effect. In the above-mentioned formula (5), xa of this alkyl chain is from 7 to 15. xa is preferably 11. When xa is 7 or more, modified polydimethylsiloxane 2 has good solubility in fats and oils. When xa is 15 or less, decrease in stability is easily prevented when the oil composition is dispersed in water or a solvent.

The polyglycerol chain of modified polydimethylsiloxane 2 is compatible with water and stabilizes micelles when the oil composition is dispersed in water. In the above-mentioned formula (7), yb of this polyglycerol chain is from 1 to 5. Preferably, yb is 3. When yb is 1 or more, modified polydimethylsiloxane 2 has good affinity with water, and the resulting emulsion has good stability. When yb is 5 or less, good thermal stability is obtained. There may be alkyl groups between the polyglycerol and the polydimethylsiloxane. With respect to the range, mb is from 0 to 3, preferably 0. When mb is 3 or less, modified polydimethylsiloxane 2 has a good dispersibility in water, and the resulting emulsion has good stability.

When modified polydimethylsiloxane 2 has a polydimethylsiloxyalkyl chain, the compound has a high solubility in the amino-modified silicone. The alkyl part of the polydimethylsiloxyalkyl chain is a saturated hydrocarbon in which na is from 1 to 5 in the above-mentioned formula (9). Preferably, na is 2. When na is 5 or less, modified polydimethylsiloxane 2 has a well-balanced solubility in the aromatic esters and the amino-modified silicone, thus exhibiting good compatibilizing effect. The length of the polydimethylsiloxy part is determined by the total balance. Specifically, za in the above-mentioned formula (9) is in the range of 3 to 60, which is a value by which modified polydimethylsiloxane 2 has a kinematic viscosity ranging from 3000 to 5000 mm$^2$/s at 25° C. Preferably, za is from 5 to 30. When za is 3 or more, modified polydimethylsiloxane 2 has good solubility in the amino-modified silicone, and exhibiting good compatibilizing effect. When za is 60 or less, modified polydimethylsiloxane 2 does not have too high solubility in the amino-modified silicone, resulting in well-balanced compatibilization.

The above-mentioned modified polydimethylsiloxane 2 preferably has a kinematic viscosity of 3000 to 5000 mm$^2$/s at 25° C., more preferably 3500 to 4500 mm$^2$/s. When the kinematic viscosity is 3000 mm$^2$/s or more, the molecular weight of modified polydimethylsiloxane 2 is not too small, which allows the above-mentioned polyglycerol chain and alkyl chain to be uniformly introduced into the structure and improves thermal stability. In addition, when modified polydimethylsiloxane 2 has a kinematic viscosity of 5000 mm$^2$/s or lower, the oil composition is easily emulsified and the resulting emulsion will have good stability. In addition, it becomes easy to prevent a decrease in operability due to deposition of a highly viscous material on the drying rolls in the drying step after the oil composition is applied to the precursor fiber bundle.

The kinematic viscosity of modified polydimethylsiloxane 2 can be determined in the same manner as the kinematic viscosity of the amino-modified silicone.

The above-mentioned modified polydimethylsiloxane 2 has 1 to 20, preferably 2 to 5, each of the units represented by the above-mentioned formulae (5), (7), and (9). When the number is within this range, the balance among these units is good, leading to good compatibilization ability, which is the objective. When the number of unit represented by each of the above-mentioned formulae (5), (7), and (9) is 2 or more, xa, yb, za, mb, and na may be the same or different between these units.

Moreover, modified polydimethylsiloxane 2 may contain a unit represented by the following formula (10).

[Chem 18]

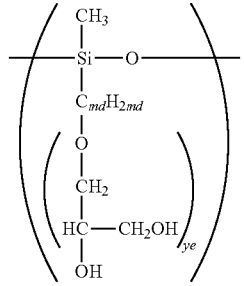

In formula (10), and is from 0 to 3, and ye is from 1 to 5.
(Combination 3)

The above-mentioned modified polydimethylsiloxane preferably has 1 to 20 each of the units represented by the above-mentioned formulae (5) and (8) and a kinematic viscosity of 500 to 1500 mm$^2$/s at 25° C. (hereinafter referred to as "modified polydimethylsiloxane 3").

The alkyl chain of modified polydimethylsiloxane 3 is compatible with fats and oils. Because of the effects of this part, modified polydimethylsiloxane 3 is dissolved in the amino-modified silicone and both of aromatic ester compounds (1) and (2) represented by the above-mentioned formula (1) and the above-mentioned formula (2), exhibiting compatibilizing effect. In the above-mentioned formula (5), xa of this alkyl chain is from 7 to 15. Preferably, xa is from 9 to 13. When xa is 7 or more, modified polydimethylsiloxane 3 has good solubility in fats and oils. When xa is 15 or less, good stability is obtained when the oil composition is dispersed in water or a solvent.

The polyether chain of modified polydimethylsiloxane 3 is compatible with water and stabilizes micelles when the oil composition is dispersed in water. The numbers of ethylene oxide and propylene oxide in the polyether chain is in the range that meets the following condition in the above-mentioned formula (8): yc+yd=5 to 15. Preferably, yc+yd=8 to 12. When yc+yd is 5 or more, modified polydimethylsiloxane 3 has good affinity with water, and the resulting emulsion has good stability. When yc+yd is 15 or less, good thermal stability is obtained. There may be alkyl groups between the polyether chain and the polydimethylsiloxane. With respect to the range, mc is 0 to 3, preferably 0. When mc is 3 or less, modified polydimethylsiloxane 3 has a good dispersibility in water, and the resulting emulsion has good stability.

The above-mentioned modified polydimethylsiloxane 3 preferably has a kinematic viscosity of 500 to 1500 mm$^2$/s at 25° C., more preferably 800 to 1200 mm$^2$/s. When the kinematic viscosity is 500 mm$^2$/s or more, the molecular weight of modified polydimethylsiloxane 3 is not too small, which allows the above-mentioned polyether chain and alkyl chain to be uniformly introduced into the structure and improves thermal stability. In addition, when modified polydimethylsiloxane 3 has a kinematic viscosity of 1500 mm$^2$/s or lower, the oil composition is easily emulsified and the resulting emulsion will have good stability. In addition, it becomes easy to prevent a decrease in operability due to deposition of a highly viscous material on the drying rolls in the drying step after the oil composition is applied to the precursor fiber bundle.

The kinematic viscosity of modified polydimethylsiloxane 3 can be determined in the same manner as the kinematic viscosity of the amino-modified silicone.

The above-mentioned modified polydimethylsiloxane 3 has 1 to 20, preferably 2 to 5, each of the units represented by the above-mentioned formulae (5) and (8). When the number is within this range, the balance among these units is good, leading to good compatibilization ability, which is the objective. When the number of unit represented by each of the above-mentioned formulae (5) and (8) is 2 or more, xa, yc, yd, and mc may be the same or different between these units.

Antistatic Agent:

As an antistatic agent, known substances may be used. Antistatic agents are broadly classified into ionic and nonionic antistatic agents. The ionic antistatic agents include anionic antistatic agents, cationic antistatic agents, and amphoteric antistatic agents. Nonionic antistatic agents include polyethylene glycol-type antistatic agents and polyhydric alcohol-type antistatic agents. From the viewpoint of antistatic effect, ionic antistatic agents are preferable. Of them, aliphatic sulfonates, higher alcohol sulfates, higher alcohol ethylene oxide adduct sulfates, higher alcohol phosphates, higher alcohol ethylene oxide adduct sulfate-phosphates, quaternary ammonium salt-type cationic surfactants, betaine-type amphoteric surfactants, higher alcohol ethylene oxide adduct polyethylene glycol fatty acid esters, and polyhydric alcohol fatty acid esters are preferred.

These antistatic agents may be used independently or in combination.

The content of the antistatic agent is preferably 1.0 to 5.0 parts by mass and more preferably 1.0 to 3.0 parts by mass relative to 100 parts by mass representing the total quantity of the above-mentioned amino-modified silicone, the aromatic ester compound (1), and the aromatic ester compound (2). When the content of the antistatic agent is 1.0 parts by mass or more, the antistatic effect is easily obtained. As a result, problems, such as merging with the adjacent bundle and entwining with the conveying rollers of the electrostatically charged and broadened carbon-fiber-precursor acrylic fiber bundle with an oil composition adhering thereto, can be easily prevented in steps after adhesion of the oil composition, particularly the calcination step. On the other hand, when the content of the antistatic agent is 5.0 parts by mass or less, it is easy to prevent process failure resulting from frothing of the oil composition dispersion at the time of applying the oil composition to the precursor fiber bundle and from decomposition of the antistatic agent in the calcination step and resulting accumulation of the decomposition product in the furnace in the calcination step.

Antioxidant:

As an antioxidant, various known substances may be used, but a phenolic antioxidant and a sulfur-based antioxidant are suitable.

Examples of the phenolic antioxidant include 2,6-di-t-butyl-p-cresol,
4,4'-butylidenebis-(6-t-butyl-3-methylphenol),
2,2'-methylenebis-(4-methyl-6-t-butylphenol),
2,2'-methylenebis-(4-ethyl-6-t-butylphenol), 2,6-di-t-butyl-4-ethylphenol,
1,1,3-tris(2-methyl-4-hydroxy-5-t-butylphenyl)butane,
n-octadecyl-3-(3,5-di-t-butyl-4-hydroxyphenyl)propionate,
tetrakis[methylene-3-(3,5-di-t-butyl-4-hydroxyphenyl)propionate]methane, triethylene glycol bis[3-(3-t-butyl-4-hydroxy-5-methylphenyl)propionate], and
tris(3,5-di-t-butyl-4-hydroxybenzyl)isocyanurate.

Examples of sulfur-based antioxidants include dilauryl thiodipropionate, distearyl thiodipropionate, dimyristyl thiodipropionate, and ditridecyl thiodipropionate. These antioxidants may be used independently or in combination.

The antioxidant is preferably a substance that acts on both the aromatic ester compounds (1) and (2) having structures represented by the above-mentioned formula (1) and the above-mentioned formula (2) and the amino-modified silicone. Of the above-mentioned substances,
tetrakis[methylene-3-(3,5-di-t-butyl-4-hydroxyphenyl)propionate]methane and
triethylene glycol bis[3-(3-t-butyl-4-hydroxy-5-methylphenyl)propionate] are preferred.

The content of the antioxidant is preferably 0.5 to 3.0 parts by mass and more preferably 0.5 to 2.0 parts by mass relative to 100 parts by mass representing the total quantity of the above-mentioned amino-modified silicone, aromatic ester compound (1), and aromatic ester compound (2). When the content of the antioxidant is 0.5 parts by mass or more, antioxidant effect can be easily obtained. For this reason, it is easy under this condition to prevent resinification of the amino-modified silicone in the oil composition adhering to the precursor fiber bundle because of heating due to a heated roll etc. in the drying densification step and the secondary drawing step. The details are described later. When the amino-modified silicone is resinified, it tends to be accumulated on the surface of a roll and the like, the precursor fiber bundle with an oil composition adhering thereto is entwined around the roll and the like, leasing to process failure and decreased operability. On the other hand, when the content of the antioxidant is 3.0 parts by mass or less, the antioxidant is easily dispersed in the oil composition.

Antimicrobial Agent:

When the oil composition of the present invention is dispersed in water or a solvent to prepare an oil composition dispersion, the oil composition of the present invention preferably contains an antimicrobial agent, because the agent can prevent degradation of the oil composition dispersion.

As an antimicrobial agent, known substances may be used. Examples include isothiazoline compounds, such as 5-chloro-2-methyl-4-isothiazoline-3-one, 2-methyl-4-isothiazoline-3-one, 1,2-benzisothiazolin-3-one, N-n-butyl-1,2-benzisothiazolin-3-one, 2-n-octyl-4-isothiazoline-3-one, 4,5-dichloro-2-n-octyl-4-isothiazoline-3-one, and 2-methyl-4,5-trimethylene-4-isothiazoline-3-one; organic bromine compounds, such as 2-bromo-2-nitropropane-1,3-diol, 2,2-dibromo-2-nitroethanol, 2,2-dibromo-3-nitrilopropionamide, 1,2-dibromo-2,4-dicyanobutane, and hexabromodimethylsulfone; aldehyde-based compounds, such as formaldehyde, glutaraldehyde, and o-phthalaldehyde; phenolic compounds, such as 3-methyl-4-isopropylphenol, 2-isopropyl-5-methylphenol, o-phenylphenol, 4-chloro-3,5-dimethylphenol, 2,4,4'-trichloro-2'-hydroxydiphenyl ether, and 4,4'-dichloro-2'-hydroxydiphenyl ether; pyridine compounds, such as 8-oxyquinoline, 2,3,5,6-tetrachloro-4-(methylsulfonyl) pyridine, bis(2-pyridylthio-1-oxide) zinc, and (2-pyridylthio-1-oxide) sodium; triazine-type compounds, such as N,N',N"-tris hydroxyethyl hexahydro-s-triazine and N,N',N"-tris ethyl hexahydro-s-triazine; anilide-based compounds, such as 3,4,4'-trichlorocarbanilide and 3-trifluoromethyl-4,4'-dichlorocarbanilide; triazole-based compounds, such as 2-(4-thiocyanomethylthio)benzimidazole; imidazole-based compounds, such as 2-(4-thiazolyl)-benzimidazole and 2-benzimidazole methyl carbamate; triazole compounds, such as 1-[[2-(2,4-dichlorophenyl)-4-n-propyl-1,3-dioxolane-2-yl]methyl]-1H-1,2,4-triazole, (RS)-

2-(2,4-dichlorophenyl)-1-(1H-1,2,4-triazole-1-yl) hexan-2-ol, α-[2-(4-chlorophenyl)ethyl]-α-(1,1-dimethyl ethyl)-1H-1,2,4-triazole-1-ethanol, α-(chlorophenyl)-α-(1-cyclopropylethyl)-1H-1,2,4-triazole-1-ethanol, and 2-(2,4-dichlorophenyl)-1,3-dioxolane-2-yl]methyl-1H-1,2,4-triazole; Nitrile-based compounds, such as 2,4,5,6-tetrachloroisophthalonitrile and 5-chloro-2,4,6-trifluoroisophthalonitrile; chlorinated organic compounds, such as 4,5-dichloro-1,2-dithiolane-3-one and 3,3,4,4-tetrachlorotetrahydrothiophene-1,1-dioxide; and organic iodine compounds, such as 3-iodo-2-propynyl butylcarbamate and diiodomethyl-p-tolylsulfone, 2,3,3-triiodoallylalcohol. Of these substances, isothiazoline-based antimicrobial agents are preferred.

These antimicrobial agents may be used independently or in combination.

The quantity of the antimicrobial agent to be added is preferably 100 to 10000 ppm and more preferably 1000 to 5000 ppm in 100% by mass of the oil composition. When the quantity of the antimicrobial agent to be added is 100 ppm or more, antimicrobial effect can be easily obtained. On the other hand, when the quantity of the antimicrobial agent to be added is 10000 ppm or less, it is easy to prevent the antimicrobial agent or the decomposition product of the antimicrobial agent from damaging the fiber bundle in the calcination step and decreasing the quality of the carbon fiber bundle obtained.

The above-described oil composition according to the present invention contains specific quantities of 2 types of aromatic ester compounds having specific structures and an amino-modified silicone and thereby can maintain bundlability in the flameproofing step even if the silicone component in the oil composition is reduced, and effectively prevent the fusion between single fibers. The reduction in the proportion of the silicone component also reduces the occurrence of silicon compounds. As a result, decrease in operability and process failure can be reduced, and industrial productivity can be maintained. Therefore, the oil composition according to the present invention enable a carbon fiber bundle with excellent mechanical properties to be obtained from stable continuous operation.

Thus, the problems with the conventional oil composition containing silicone as the main component and the problems with the oil composition with decreased silicone content can be simultaneously solved by the oil composition of the present invention.

<Process for Producing a Carbon-Fiber-Precursor Acrylic Fiber Bundle with an Oil Composition Adhering Thereto>

The process for producing a carbon-fiber-precursor acrylic fiber bundle with an oil composition adhering thereto according to the present invention includes a step of applying the above-mentioned oil composition of the present invention to a precursor fiber bundle in a water-swelled state (oil composition application treatment) and a subsequent step of drying densification of the precursor fiber bundle that has undergone the oil composition application treatment.

Steps of the process for producing a carbon-fiber-precursor acrylic fiber bundle with an oil composition adhering thereto are described below in detail.

(Spinning)

In the present invention, an acrylic fiber bundle spun by known art can be used as the precursor fiber bundle. Examples include an acrylic fiber bundle obtained by spinning an acrylonitrile-based polymer.

The acrylonitrile-based polymer is a polymer obtained by using acrylonitrile as the main monomer and polymerizing the monomer. The acrylonitrile-based polymer may be not only a homopolymer obtained only from acrylonitrile but also an acrylonitrile-based copolymer in which other monomers are used in addition to acrylonitrile, which is the main component.

The content of the acrylonitrile unit in the acrylonitrile-based copolymer is more preferably 96.0 to 98.5% by mass from the viewpoint of preventing the thermal fusion of fibers in the calcination step, the heat resistance of the copolymer, the stability of a spinning dope, and the quality of the resulting carbon fibers. The acrylonitrile unit of 96% by mass or more is preferred, because fibers are not liable to be fused in the calcination step where the fibers are converted to carbon fibers, and excellent quality and performance of carbon fiber can be maintained. Furthermore, since the heat resistance of the copolymer itself is not low, the adhesion between single fibers can be avoided in steps, such as drying precursor fibers or drawing thereof by heating rollers or pressurized steam in the spinning of the fibers. On the other hand, the acrylonitrile unit of 98.5% by mass or less is preferred, because the solubility of the copolymer into a solvent is not reduced; the stability of the spinning dope can be maintained; the precipitation and coagulation properties of the copolymer are not increased; and stable production of the precursor fiber is achieved.

When a copolymer is used, a monomer other than acrylonitrile is suitably selected from vinyl monomers that can be copolymerized with acrylonitrile. For example, such a monomer is preferably selected from monomers having the effect of promoting frameproofing reaction, such as acrylic acid, methacrylic acid, itaconic acid, and an alkali metal salt or an ammonium salt thereof, and acrylamide because these monomers can promote flameproofing.

As a vinyl monomer that can be copolymerized with acrylonitrile, a carboxyl group-containing vinyl monomer, such as acrylic acid, methacrylic acid, and itaconic acid is more preferred. The content of the carboxyl group-containing vinyl monomer unit in the acrylonitrile-based copolymer is preferably 0.5 to 2.0% by mass.

These vinyl monomers may be used independently or in combination.

At the time of spinning, the acrylonitrile-based polymer is dissolved in a solvent to prepare a spinning dope. The solvent for preparing the spinning dope can be suitably selected and used from known solvents, such as organic solvents, such as dimethylacetamide, dimethyl sulfoxide, and dimethylformamide and aqueous solutions of an inorganic compound, such as zinc chloride and sodium thiocyanate. Dimethylacetamide, dimethyl sulfoxide, and dimethylformamide that have a fast rate of coagulation are preferred from the viewpoint of productivity improvement, dimethylacetamide being more preferred.

In order to obtain a dense coagulated-yarn, it is preferred to prepare the spinning dope so that the polymer concentration of the spinning dope is equal to or more than a certain level. Specifically, the polymer concentration in the spinning dope is preferably 17% by mass or more and more preferably 19% by mass or more. In addition, since the spinning dope requires proper viscosity and fluidity, the polymer concentration is preferably in the range not exceeding 25% by mass.

As the spinning method, known spinning methods can be appropriately employed, such as a wet spinning method in which the above spinning dope is directly spun into a coagulation bath, a dry spinning method in which the spinning dope is coagulated in the air, and a dry-wet spinning method in which the spinning dope is once spun in the air and then coagulated in a bath. For obtaining a carbon fiber bundle having higher performance, a wet spinning method or a dry-wet spinning method is preferred.

Spinning and shaping by a wet spinning method or a dry-wet spinning method can be performed by spinning the above spinning dope into a coagulation bath through a nozzle having a hole with a circular section. An aqueous solution containing a solvent used for the above spinning dope is preferably used as the coagulation bath from the viewpoint of the ease of solvent recovery.

When an aqueous solution containing a solvent is used as a coagulation bath, the concentration of the solvent in the aqueous solution is preferably 50 to 85% by mass and the temperature of the coagulation bath is preferably 10° C. to 60° C. because when these parameters are in these ranges, a high-performance carbon fiber bundle having no void and a dense structure can be obtained, drawability is ensured, and excellent productivity is achieved.

(Drawing Treatment)

A polymer or a copolymer is dissolved in a solvent to form a spinning dope, which is discharged into a coagulation bath to form a fiber. Thus obtained coagulated fiber can be subjected to drawing in a bath, in which it is drawn in a coagulation bath or in a drawing bath. Alternatively, part of the coagulated fiber may be drawn in the air followed by drawing in a bath, and may be washed with water before or after drawing or simultaneously with drawing to obtain a precursor fiber bundle in a water-swollen state.

Generally, from the viewpoint of the performance of the resulting carbon fiber bundle, the drawing in a bath is preferably performed in a water bath of 50° C. to 98° C. in one stage or multiple stages, and the coagulated-yarn is preferably drawn in such a manner that a total draw ratio of the drawing in the air and the drawing in a bath is 2 to 10 times.

(Oil Composition Application Treatment)

For the application of the oil composition to the precursor fiber bundle, an oil composition dispersion obtained by dispersing the oil composition of the present invention in water or a solvent is used. When the oil composition dispersion is an emulsion, a dispersion in which the oil composition forms micelles with an average particle size of 0.01 to 0.50 m is preferably used as the oil composition dispersion.

When the average particle size of the micelles is within the above-mentioned range, the oil composition can be uniformly applied to the surface of the precursor fiber bundle.

The average particle size of the micelles in the oil composition dispersion can be measured using a laser diffraction/scatter type particle size distribution measuring instrument (trade name, "LA-910"; manufactured by Horiba, Ltd.).

Known art can be used as the method for preparing the oil composition dispersion as far as the aromatic ester compounds (1) and (2) and the amino-modified silicone can be dispersed. The oil composition dispersion can be prepared, for example, in the following manner: an aromatic ester compounds (1) and (2) and an amino-modified silicone are mixed, and a nonionic surfactant is added to the mixture while stirring for dispersion. Water or a solvent is further added to obtain an oil composition dispersion in which an oil composition is dispersed in water.

Examples of the solvent include alcohols, such as methanol, ethanol, isopropyl alcohol, and isobutanol; ketones, such as acetone, methyl ethyl ketone, and cyclohexanone; esters, such as ethyl acetate and butyl acetate; ethers, such as methoxybutanol and butyl cellosolve; amides, such as dimethylacetamide and dimethylformamide; dimethylsulfoxide etc.; and solutions of inorganic compounds, such as zinc chloride and sodium thiocyanate.

The oil composition dispersion can also be prepared in the following manner: To amino-modified silicone and a nonionic surfactant, aromatic ester compounds (1) and (2) are added while stirring for dispersion. Water or a solvent is further added to obtain an oil composition dispersion in which an oil composition is dispersed in water.

When an antioxidant is added, the antioxidant is preferably dissolved in the amino-modified silicone beforehand. When an antistatic agent and/or an antimicrobial agent are added, it is preferred to add ion-exchanged water to the oil composition to prepare an oil composition dispersion and add these agents to the dispersion and stir.

Mixing or dispersing in water of components can be performed by propeller stirring, homomixer, homogenizer, etc. It is particularly preferred to use an ultra high-pressure homogenizer that can apply a pressure of 150 MPa or more.

The concentration of the oil composition in the oil composition dispersion is preferably 2 to 40% by mass, more preferably 10 to 30% by mass, and particularly preferably 20 to 30% by mass. When the concentration of the oil composition is 2% by mass or higher, the oil composition can be diluted to the defined concentration, and the quantity of the oil composition dispersion to be stored and transported can be small. On the other hand, when the concentration of the oil composition is 40% by mass or lower, the oil composition dispersion is stable, and micelles tend not to be broken.

When the oil composition of the present invention is applied to the precursor fiber bundle in water-swelled state, the above-mentioned oil composition dispersion is preferably further diluted with ion-exchanged water to the defined concentration before use.

The term "defined concentration" as used herein refers to the concentration that is adjusted in accordance with the condition of the precursor fiber bundle at the time of applying the oil composition so that the proper quantity of the oil composition adheres to the precursor fiber bundle.

In the present invention, the liquid prepared by diluting the oil composition dispersion to a defined concentration and applied to the precursor fiber bundle is referred to as the "oil agent."

The application of the oil composition to the precursor fiber bundle can be performed by applying the oil agent to the precursor fiber bundle in a water-swelled state after the above-mentioned drawing in a bath.

When washing is performed after drawing in a bath, the oil agent can also be applied to the fiber bundle in a water-swelled state obtained after drawing in a bath and washing.

As a method for applying the oil composition to the precursor fiber bundle in a water-swelled state, a method can be used in which the oil composition dispersion obtained by dispersing the oil composition in water is further diluted with ion-exchanged water to a defined concentration to prepare the oil agent, and the oil agent is adhered to the precursor fiber bundle in a water-swelled state.

As a method for adhering the oil agent to the precursor fiber bundle in a water-swelled state, such known method can be used as the roller adhesion method, in which the lower part of a roller is soaked in the oil agent, and the precursor fiber bundle is contacted with the upper part of the roller; the guide adhesion method, in which a certain quantity of the oil agent is discharged from a guide by a pump, and the precursor fiber bundle is contacted with the surface of the guide; spray adhesion method, in which a certain quantity of the oil agent is sprayed through a nozzle onto the precursor fiber bundle; and the dip adhesion method, in which the precursor fiber bundle is immersed in the oil agent and then squeezed by a roller or the like to remove excess oil agent.

Of these methods, the dip adhesion method, in which the oil agent is sufficiently permeated into the precursor fiber bundle, and excess treatment solution is removed, is preferred from the viewpoint of uniform adhesion. For more uniformly adhering the oil agent, it is effective to divide the oil agent-applying step into a multistage step having two or more stages to apply the oil agent repeatedly.

(Drying Densification Treatment)

The precursor fiber bundle to which the oil agent has been applied is then dried and densified in the subsequent drying step. It is necessary to perform the drying and densification at a temperature exceeding the glass transition temperature of the fiber, but the glass transition temperature can vary depending on whether the fiber is in a water-containing state or a dry state. It is preferable, for example, to perform the drying densification by a method using a heating roller at a temperature of about 100° C. to 200° C. In this method, the number of heating roller may be one or more.

(Secondary Drawing Treatment)

The precursor fiber bundle that has been dried and densified with an oil composition adhered thereto is preferably subjected to a further drawing treatment. As a method for drawing, such known drawing techniques can be used as steam drawing by pressurized or atmospheric steam, heating platen drawing, and drawing by a heating roller.

Of the above-mentioned methods, drawing by a heating roller is preferred because stable and uniform drawing is possible with this method. By such drawing treatment, the denseness and degree of orientation of the obtained carbon-fiber-precursor acrylic fiber bundle with an oil composition adhering thereto can be further enhanced. In particular, when the precursor fiber bundle that has been dried and densified with an oil composition adhered thereto is drawn to 1.1 to 4.0 times its original length by conveying the oil composition by a heating roller while changing the roller speed, the denseness and degree of orientation of the obtained carbon-fiber-precursor acrylic fiber bundle with an oil composition adhering thereto can be further enhanced.

The temperature of the heating roller is preferably about 150° C. to 200° C.

When the temperature of the heating roller is 150° C. or higher, it is easy to prevent fluffing that can occur at the time of drawing, and it is also easy to prevent a decrease in operability due to process failure in which the fiber bundle is entwined around the roller in the subsequent carbonization step. On the other hand, when the temperature of the heating roller is 200° C. or lower, it is easy to prevent oxidization reaction or decomposition reaction, and it is easy to prevent a decrease in the quality of the carbon fiber bundle, which is obtained by calcining the carbon-fiber-precursor acrylic fiber bundle with an oil composition adhering thereto.

The carbon-fiber-precursor acrylic fiber bundle with an oil composition adhering thereto that has been obtained through the drying densification treatment and the secondary drawing treatment is passed through a roll at room temperature to cool the bundle to room temperature and then wound on a bobbin by a winder or thrown into a can for storage.

Subsequently, the carbon-fiber-precursor acrylic fiber bundle with an oil composition adhering thereto is transferred to the calcination step to prepare a carbon fiber bundle.

<Carbon-Fiber-Precursor Acrylic Fiber Bundle with an Oil Composition Adhering Thereto>

The thus obtained carbon-fiber-precursor acrylic fiber bundle with an oil composition adhering thereto according to the present invention has an amino-modified silicone, an aromatic ester compound (1), and an aromatic ester compound (2) adhering thereto, and these meet the following requirements (a) to (c):

(a) The adhesion amount of the amino-modified silicone is 0.01 to 0.2% by mass relative to the mass of the dry fiber.

(b) The total adhesion amount of the aromatic ester compound (1) and the aromatic ester compound (2) is 0.4 to 1.2% by mass relative to the mass of the dry fiber.

(c) The ratio of the adhesion amounts of the aromatic ester compound (1) and the aromatic ester compound (2) (the aromatic ester compound (2)/the aromatic ester compound (1)) is 0.25 to 6.5.

The term "the mass of the dry fiber" as used herein refers to the mass of the dry fiber of the precursor fiber bundle with an oil composition adhering thereto after the drying densification treatment.

Requirement (a);

The adhesion amount of the amino-modified silicone is 0.01 to 0.2% by mass, preferably 0.05 to 0.15% by mass, relative to the mass of the dry fiber. When the adhesion amount of the amino-modified silicone is 0.01% by mass or more, the amino-modified silicone easily exhibits its intrinsic function. On the other hand, when the adhesion amount of the amino-modified silicone is 0.2% by mass or less, it is easy to prevent that a high-molecular weight compound forming from the adhering amino-modified silicone in the calcination step invites the adhesion between single fibers.

Requirement (b);

The total adhesion amount of the aromatic ester compound (1) and the aromatic ester compound (2) is 0.4 to 1.2% by mass, preferably 0.5 to 1.1% by mass and more preferably 0.5 to 0.9% by mass, relative to the mass of the dry fiber. When the total adhesion amount of the aromatic ester compound (1) and the aromatic ester compound (2) is within the above-mentioned range, a carbon fiber with a high strength is obtained.

Requirement (c);

The ratio of the adhesion amounts of the aromatic ester compound (1) and the aromatic ester compound (2) (the aromatic ester compound (2)/the aromatic ester compound (1)) is 0.25 to 6.5. When the ratio of the adhesion amounts is within the above-mentioned range, a carbon fiber with a high strength is obtained. In particular, when the ratio of the adhesion amounts is 1 or higher, a sufficient bundlability can be given to the carbon-fiber-precursor acrylic fiber bundle with an oil composition adhering thereto, and at the same time operability is improved. On the other hand, when the ratio of the adhesion amounts is 6.5 or lower, the fusion between fibers can easily be prevented, and a carbon fiber bundle with good mechanical properties is obtained. From the viewpoint of giving strength to the carbon fiber, the ratio of the adhesion amounts is preferably 1.0 to 5 and more preferably 1.2 to 3.

The adhesion amount of each component in the oil composition is determined in the following manner:

After applying the oil agent, drying densification and drawing are performed to obtain a carbon-fiber-precursor acrylic fiber bundle with an oil composition adhering thereto. About 2 g of the bundle is collected and dried at 105° C. for 1 hour, and the mass of the dry fiber ($w_1$) is measured. Subsequently, in accordance with the Soxhlet extraction method using methyl ethyl ketone, the carbonfiber-precursor acrylic fiber bundle with an oil composition adhering thereto is immersed in methyl ethyl ketone at 90° C. for 8 hours to perform solvent extraction of the adhering oil agent. Then the bundle is dried at 105° C. for 1 hour, and the mass of the dry fiber ($w_2$) is measured. The adhesion amount of the oil agent is determined by the following formula (1):

Adhesion amount of oil agent [% by mass]=($w_1$−$w_2$)/$w_1$×100    (i)

The adhesion amount of each component of the oil composition that is adhering to the carbon-fiber-precursor acrylic fiber bundle with an oil composition adhering thereto is calculated from the adhesion amount of the oil agent and the composition ratio of the oil composition in the oil agent.

The balance of the oil composition in the oil agent treatment tank shows that the constitution of the oil composition adhering to the carbon-fiber-precursor acrylic fiber bundle with an oil composition adhering thereto is the same as the constitution of the adjusted oil composition.

The carbon-fiber-precursor acrylic fiber bundle with an oil composition adhering thereto according to the present invention preferably has an amino-modified silicone represented by the above-mentioned formula (3) adhering thereto as the amino-modified silicone.

Moreover, to the carbon-fiber-precursor acrylic fiber bundle with an oil composition adhering thereto in the present invention, a block copolymerization polyether consisting of a PO unit and an EO unit and having a structure represented by the above-mentioned formula (4) is preferably further adhered in a quantity of 5 to 70 parts by mass relative to 100 parts by mass representing the total adhesion amount of the above-mentioned aromatic ester compound (1), the above-mentioned aromatic ester compound (2), and the above-mentioned amino-modified silicone relative to the mass of the dry fiber. The amount of the further adhesion is more preferably 28 to 43 parts by mass from the viewpoint of mechanical properties. When the amount is 5 parts by mass or more, the oil composition is uniformly adhered, and good mechanical properties are obtained. On the other hand, when the amount is 70 parts by mass or less, the mechanical properties tend not to be decreased.

As described above, the process for producing a carbon-fiber-precursor acrylic fiber bundle with an oil composition adhering thereto according to the present invention uses an oil composition of the present invention and, therefore, is capable of manufacturing, with good productivity, a carbon-fiber-precursor acrylic fiber bundle with an oil composition adhering thereto having excellent bundlability.

Furthermore, the carbon-fiber-precursor acrylic fiber bundle with an oil composition adhering thereto according to the present invention is excellent in bundlability because specific quantities of the amino-modified silicone, the aromatic ester compound (1), and the aromatic ester compound (2) are adhered to the bundle. In addition, operability and step passability are significantly improved because the fusion between single fibers is prevented, and the production of silicon compounds and the scattering of the silicone decomposition product are suppressed in the calcination step.

Moreover, the carbon fiber bundle obtained by calcining the carbon-fiber-precursor acrylic fiber bundle with an oil composition adhering thereto according to the present invention has excellent mechanical properties, a high quality, and is suitable as a reinforcing fiber used in the fiber reinforced resin composite material used for various structural materials.

EXAMPLES

The present invention is described concretely with the examples below.

However, the present invention is not limited by these Examples. The components and various measuring methods and assessment methods used in these Examples are as follows:

<Components>
(Aromatic Ester Compounds)
A-1: Polyoxyethylene bisphenol A dilaurate (manufactured by Kao Corporation; trade name, Excepal BP-DL) having a structure represented by the above-mentioned formula (1), wherein both $R^1$ and $R^2$ are a lauryl group, and both m and n are about 1.
A-2: Tri-isodecyl trimellitate (manufactured by Kao Corporation; trade name, TRIMEX T-10) having a structure represented by the above-mentioned formula (2), wherein all of $R^3$ to $R^5$ are an isodecyl group.
A-3: Pentaerythritol tetrastearate (manufactured by NOF Corporation; trade name, UNISTER H-476)
(Amino-Modified Silicone)
B-1: Amino-modified silicone having a structure represented by the above-mentioned formula (3), wherein o is about 80, p is about 2, the kinematic viscosity is 90 mm$^2$/s at 25° C., and the amino equivalent is 2500 g/mol (manufactured by Gelest, Inc.; trade name, AMS-132),
B-2: Amino-modified silicone having a structure represented by the above-mentioned formula (3), wherein o is about 90, p is about 1, the kinematic viscosity is 110 mm$^2$/s at 25° C., and the amino equivalent is 5000 g/mol (manufactured by Shin-Etsu Chemical Co., Ltd.; trace mane, KF-868).
B-3: Amino-modified silicone having a structure represented by the above-mentioned formula (3), wherein o is about 240, p is about 3, the kinematic viscosity is 450 mm$^2$/s at 25° C., and the amino equivalent is 5700 g/mol (manufactured by Shin-Etsu Chemical Co., Ltd.; trace mane, KF-8008).
B-4: Amino-modified silicone having side chains of primary and secondary amine and having a kinematic viscosity of 10000 mm$^2$/s at 25° C., and an amino equivalent of 7000 g/mol (manufactured by Momentive Performance Materials Japan LLC; trade name, TSF4707).
(Surfactant)
C-1: PO/EO block copolymerization polyether having a structure represented by the above-mentioned formula (4), wherein x is about 75, y is about 30, and z is about 75 (manufactured by BASF Japan Ltd.; trade name, PluronicPE6800).
C-2: PO/EO block copolymerization polyether having a structure represented by the above-mentioned formula (4), wherein x is about 10, y is about 20, and z is about 10 (manufactured by ADEKA Corporation; trade name, ADEKA NOL L-44).
C-3: Nonaethylene glycol dodecyl ether (manufactured by Nikko Chemicals Co., Ltd.; trade name, NIK-KOLBL-9EX).
(Compatibilizing Agent)
D-1: Lauryl PEG-9 polydimethylsiloxyethyl dimethicone consisting of units represented by the above-mentioned formulae (5), (6), and (9) (manufactured by Shin-Etsu Chemical Co., Ltd.; trade name, KF-6038).
D-2: Lauryl polyglyceryl-3 polydimethylsiloxyethyl dimethicone consisting of units represented by the above-mentioned formulae (5), (7), and (9) (manufactured by Shin-Etsu Chemical Co., Ltd.; trade name, KF-6105).

D-3: Modified silicone consisting of units represented by the above-mentioned formulae (5) and (8) and having a random copolymer side chain of ethylene oxide and propylene oxide and an alkyl side chain (manufactured by Momentive Performance Materials Japan LLC; trade name, TSF4450).

<Measurement and Evaluation>

(Measurement of Adhesion Amount of Oil Agent)

After applying the oil agent, drying densification and drawing were performed to obtain a carbon-fiber-precursor acrylic fiber bundle with an oil composition adhering thereto. About 2 g of the bundle was collected and dried at 105° C. for 1 hour, and the mass of the dry fiber ($w_1$) was measured. Subsequently, in accordance with the Soxhlet extraction method using methyl ethyl ketone, the carbon-fiber-precursor acrylic fiber bundle with an oil composition adhering thereto was immersed in methyl ethyl ketone at 90° C. for 8 hours to perform solvent extraction of the adhering oil composition. Then the bundle was dried at 105° C. for 1 hour, and the mass of the dry fiber ($w_2$) was measured. The adhesion amount of the oil agent was determined by the following formula (1):

$$\text{Adhesion amount of oil agent [\% by mass]} = (w_1 - w_2)/w_1 \times 100 \quad \text{(i)}$$

(Evaluation of Operability)

The carbon-fiber-precursor acrylic fiber bundle with an oil composition adhering thereto was manufactured continuously for 24 hours. The operability was evaluated by the frequency of entwining of a single yarn around the conveying roller and removal thereof during manufacturing. Operability was evaluated in accordance with the following criteria:

A: Number of times of removal (time/24 hours)≤1
B: Number of times of removal (time/24 hours) 2 to 5
C: Number of times of removal (time/24 hours)>5

(Evaluation of Bundlability of Flameproofed Yarn)

Immediately after the flameproofing step, the width of the flameproofed fiber bundle on the roll was measured with digital calipers for evaluation.

(Measurement of Number of Fusions Between Single Fibers)

A carbon fiber bundle was cut into 3 mm in length, dispersed in acetone, and stirred for 10 minutes. Then, the total number of single fibers and the number of fusions between single fibers (number of fusions) were counted, and the number of fusions per 100 single fibers was calculated for evaluation. The evaluation criteria are as follows.

A: Number of fusions (piece/100 fibers)≤1
B: Number of fusions (piece/100 fibers)>1

(Measurement of Strand Strength)

After starting the manufacture of a carbon fiber bundle, samples of the carbon fiber bundle were collected after manufacturing became constant and stable. The strand strength of the carbon fiber bundle was measured in accordance with the epoxy resin-impregnated strand testing method as stipulated in JIS R-7608. The measurement count was 10 times, and the average value was evaluated.

(Measurement of Amount of Scattered Si)

With respect to the measurement of the amount of scattered silicon compounds derived from the silicone compound, the change calculated from the difference between the content ($A_1$) of silicon (Si) in the carbon-fiber-precursor acrylic fiber bundle with an oil composition adhering thereto and the content ($A_2$) of Si in the flameproofed fiber bundle was defined as the amount of scattered Si and used as an index of evaluation.

Specifically, each of the carbon-fiber-precursor acrylic fiber bundle with an oil composition adhering thereto and the flameproofed fiber bundle were finely ground with a pair of scissors to prepare samples. In a sealed crucible, 50 mg each of the samples were weighed, followed by addition of 0.25 g each of powdered NaOH and KOH, and the mixture was subjected to thermolysis in a muffle furnace at 210° C. for 150 minutes. Then the mixture was dissolved in distilled water to make 100 mL for use as the test portion. The Si content of each test portion was determined with an ICP emission spectrometer (manufactured by Thermo Electron Co., Ltd.; name of apparatus, IRIS Advantage AP), and the amount of scattered Si was calculated from the following formula (ii):

$$\text{Amount of scattered Si [mg/kg]} = A_1 - A_2 \quad \text{(ii)}$$

Example 1

(Preparation of Oil Agent)

A surfactant was added to an amino-modified silicone and mixed by stirring, and an aromatic ester compound was added to the mixture. To the above mixture was further added ion exchange water so that the concentration of the oil composition was 30% by mass, and the resulting mixture was emulsified by a homomixer. The average particle size of the micelles under such condition was measured using a laser diffraction/scatter type particle size distribution measuring instrument (manufactured by Horiba, Ltd.; name of apparatus, "LA-910") and found to be about 3 μm.

Subsequently, the micelles were further dispersed with a high-pressure homogenizer until the average particle size of the micelles became 0.3 μm or less to obtain an oil composition dispersion (emulsion). Then, ion-exchanged water was further added to prepare an oil agent in such a manner that the concentration of the oil composition dispersion is 1.7% by mass.

Table 1 shows the types and loadings (parts by mass) of the components constituting an oil composition.

(Manufacture of a Carbon-Fiber-Precursor Acrylic Fiber Bundle with an Oil Composition Adhering Thereto)

The precursor fiber bundle to which the oil composition is to be adhered was prepared in the following manner. An acrylonitrile-based copolymer (composition ratio: acrylonitrile/acrylamide/methacrylic acid=96.5/2.7/0.8 (mass ratio)) was dissolved in dimethylacetamide to prepare a spinning dope. The spinning dope was discharged into a coagulation bath filled with an aqueous dimethylacetamide solution at a concentration of 60% by mass and a temperature of 35° C. through a spinning nozzle having a pore size (diameter) of 50 μm and the number of holes of 50000 to obtain a coagulated yarn. The coagulated yarn was introduced into a water-washing tank to remove the solvent and drawn 5.5 times the initial length to obtain the precursor fiber bundle in a water-swollen state.

The above-mentioned precursor fiber bundle in a water-swollen state was introduced into an oil agent treatment tank containing the previously prepared oil agent to apply the oil agent thereto.

Then, the precursor fiber bundle which was adhered the oil agent was dried and densified with a roll having a surface temperature of 180° C. and then drawn 1.5 times the initial length with a roll having a surface temperature of 190° C. to obtain a carbon-fiber-precursor acrylic fiber bundle with an oil composition adhering thereto.

The adhesion amount of the oil agent in the obtained carbon-fiber-precursor acrylic fiber bundle with an oil composition adhering thereto was measured, and the operability during manufacturing was evaluated. The results are shown in Table 1.

(Manufacture of Carbon Fiber Bundle)

The obtained carbon-fiber-precursor acrylic fiber bundle with an oil composition adhering thereto was passed through a flameproofing furnace having a temperature gradient of 220° C. to 260° C. for flameproofing to form a flameproofed fiber bundle. The bundlability of the obtained flameproofed fiber bundle was evaluated, and the amount of scattered Si in the flameproofing step was measured. The results are shown in Table 1.

Subsequently, the flameproofed fiber bundle was calcined in a carbonization furnace having a temperature gradient of 400° C. to 1400° C. in a nitrogen atmosphere to form a carbon fiber bundle. The number of fusions between single fibers and the strand strength of the obtained carbon fiber bundle were measured. The results are shown in Table 1.

Examples 2 to 18

An oil agent was prepared, a carbon-fiber-precursor acrylic fiber bundle with an oil composition adhering thereto and a carbon fiber bundle were manufactured, and measurements and evaluations were performed in the same manner as Example 1 except that the types and loadings of the components constituting the oil composition were changed as shown in Table 1 and 2. The results are shown in Table 1 and 2.

In Examples 2 to 6, 9, and 13, the compatibilizing agent was dispersed in the amino-modified silicone in advance, and then the oil agent was prepared in the same manner as Example 1.

Comparative Examples 1 to 10

An oil agent was prepared, a carbon-fiber-precursor acrylic fiber bundle with an oil composition adhering thereto and a carbon fiber bundle were manufactured, and measurements and evaluations were performed in the same manner as Example 1 except that the types and loadings of the components constituting the oil composition were changed as shown in Table 3. The results are shown in Table 3.

TABLE 1

| | | | Example 1 | 2 | 3 | 4 | 5 | 6 | 7 | 8 | 9 |
|---|---|---|---|---|---|---|---|---|---|---|---|
| Proportion of the Components of Oil Composition | Aromatic ester compound [parts by mass] | A-1 | 17 | 15 | 13 | 31 | 31 | 29 | 29 | 27 | 27 |
| | | A-2 | 66 | 72 | 80 | 62 | 62 | 58 | 57 | 60 | 60 |
| | Amino-modified silicone [parts by mass] | B-1 | 17 | 0 | 0 | 0 | 0 | 0 | 6 | 5 | 0 |
| | | B-2 | 0 | 13 | 7 | 7 | 7 | 13 | 4 | 4 | 13 |
| | | B-3 | 0 | 0 | 0 | 0 | 0 | 0 | 4 | 4 | 0 |
| | Surfactant [parts by mass] | C-1 | 25 | 14 | 13 | 15 | 15 | 14 | 21 | 20 | 7 |
| | | C-2 | 25 | 14 | 7 | 15 | 15 | 14 | 21 | 13 | 7 |
| | | C-3 | 17 | 14 | 0 | 15 | 8 | 14 | 0 | 0 | 13 |
| | Compatibilizing agent [parts by mass] | D-1 | 0 | 0 | 0 | 8 | 0 | 0 | 0 | 0 | 7 |
| | | D-2 | 0 | 1.5 | 0 | 0 | 0 | 1 | 0 | 0 | 0 |
| | | D-3 | 0 | 0 | 13 | 0 | 15 | 0 | 0 | 0 | 0 |
| | Mass ratio (A-2/A-1) | | 3.88 | 4.80 | 6.15 | 2.00 | 2.00 | 2.00 | 1.97 | 2.22 | 2.22 |
| | Content of amino-modified silicone [parts by mass] | | 20 | 15 | 8 | 8 | 8 | 15 | 16 | 15 | 15 |
| | Adhesion amount of oil agent [% by mass] | | 1.2 | 0.9 | 1.1 | 1.1 | 1.0 | 1.4 | 1.2 | 1.3 | 1.0 |
| | Adhesion amount of amino-modified silicone [% by mass] | | 0.12 | 0.08 | 0.06 | 0.05 | 0.05 | 0.13 | 0.12 | 0.13 | 0.10 |
| | Adhesion amount of aromatic ester compound (A-1 + A-2) [% by mass] | | 0.60 | 0.55 | 0.77 | 0.67 | 0.61 | 0.85 | 0.73 | 0.85 | 0.65 |
| | Ratio of adhesion amounts (A-2/A-1) | | 3.88 | 4.80 | 6.15 | 2.00 | 2.00 | 2.00 | 1.97 | 2.22 | 2.22 |
| Evaluation | Operability | | A | A | A | A | A | A | A | A | A |
| | Flameproofing bundlability [mm] | | 22 | 21 | 23 | 19 | 20 | 20 | 21 | 20 | 21 |
| | Amount of scattered Si [mg/kg] | | 120 | 120 | 210 | 110 | 170 | 120 | 100 | 110 | 180 |
| | Number of fusions between single fibers | | A | A | A | A | A | A | A | A | A |
| | Strand strength [GPa] | | 5.3 | 5.3 | 5.2 | 5.5 | 5.4 | 5.3 | 5.4 | 5.5 | 5.4 |

TABLE 2

| | | | Example 10 | 11 | 12 | 13 | 14 | 15 | 16 | 17 | 18 |
|---|---|---|---|---|---|---|---|---|---|---|---|
| Proportion of the Components of Oil Composition | Aromatic ester compound [parts by mass] | A-1 | 32 | 33 | 25 | 40 | 47 | 47 | 47 | 49 | 66 |
| | | A-2 | 63 | 66 | 56 | 53 | 47 | 47 | 47 | 49 | 17 |
| | Amino-modified silicone [parts by mass] | B-1 | 0 | 0 | 0 | 0 | 6 | 0 | 0 | 2 | 17 |
| | | B-2 | 5 | 1 | 19 | 7 | 0 | 6 | 0 | 0 | 0 |
| | | B-3 | 0 | 0 | 0 | 0 | 0 | 0 | 6 | 0 | 0 |
| | Surfactant [parts by mass] | C-1 | 6 | 6 | 13 | 13 | 20 | 20 | 20 | 6 | 17 |
| | | C-2 | 5 | 6 | 13 | 13 | 13 | 13 | 13 | 6 | 17 |
| | | C-3 | 11 | 10 | 0 | 0 | 0 | 0 | 0 | 11 | 34 |

TABLE 2-continued

| | | | Example | | | | | | | | |
|---|---|---|---|---|---|---|---|---|---|---|---|
| | | | 10 | 11 | 12 | 13 | 14 | 15 | 16 | 17 | 18 |
| Compatibilizing agent [parts by mass] | | D-1 | 0 | 0 | 0 | 7 | 0 | 0 | 0 | 0 | 0 |
| | | D-2 | 0 | 0 | 0 | 0 | 0 | 0 | 0 | 0 | 0 |
| | | D-3 | 0 | 0 | 0 | 0 | 0 | 0 | 0 | 0 | 0 |
| Mass ratio (A-2/A-1) | | | 1.97 | 2.00 | 2.24 | 1.33 | 1.00 | 1.00 | 1.00 | 1.00 | 0.26 |
| Content of amino-modified silicone [parts by mass] | | | 5 | 1 | 23 | 8 | 6 | 6 | 6 | 2 | 20 |
| Adhesion amount of oil agent [% by mass] | | | 1.3 | 1.1 | 0.8 | 1.1 | 1.4 | 1.3 | 1.4 | 1.4 | 1.1 |
| Adhesion amount of amino-modified silicone [% by mass] | | | 0.05 | 0.01 | 0.12 | 0.06 | 0.06 | 0.06 | 0.06 | 0.02 | 0.11 |
| Adhesion amount of aromatic ester compound (A-1 + A-2) [% by mass] | | | 1.01 | 0.89 | 0.51 | 0.77 | 0.99 | 0.92 | 0.99 | 1.12 | 0.54 |
| Ratio of adhesion amounts (A-2/A-1) | | | 1.97 | 2.00 | 2.24 | 1.33 | 1.00 | 1.00 | 1.00 | 1.00 | 0.26 |
| Evaluation | Operability | | A | A | A | A | A | A | A | A | A |
| | Flameproofing bundlability [mm] | | 21 | 23 | 19 | 19 | 20 | 20 | 20 | 21 | 21 |
| | Amount of scattered Si [mg/kg] | | 110 | 10 | 190 | 160 | 60 | 80 | 50 | 10 | 120 |
| | Number of fusions between single fibers | | A | A | A | A | A | A | A | A | A |
| | Strand strength [GPa] | | 5.4 | 4.9 | 5.5 | 5.4 | 5.2 | 5.1 | 5.2 | 4.9 | 5.0 |

TABLE 3

| | | | Comparative Example | | | | | | | | | |
|---|---|---|---|---|---|---|---|---|---|---|---|---|
| | | | 1 | 2 | 3 | 4 | 5 | 6 | 7 | 8 | 9 | 10 |
| Proportion of the Components of Oil Composition | Aromatic ester compound [parts by mass] | A-1 | 12 | 33 | 75 | 47 | 86 | 0 | 0 | 0 | 0 | 0 |
| | | A-2 | 87 | 67 | 8 | 0 | 0 | 47 | 86 | 0 | 0 | 0 |
| | | A-3 | 0 | 0 | 0 | 47 | 0 | 47 | 0 | 93 | 100 | 0 |
| | Amino-modified silicone [parts by mass] | B-1 | 1 | 0 | 17 | 6 | 0 | 6 | 0 | 7 | 0 | 100 |
| | | B-4 | 0 | 0 | 0 | 0 | 14 | 0 | 14 | 0 | 0 | 0 |
| | Surfactant [parts by mass] | C-1 | 6 | 6 | 17 | 20 | 21 | 20 | 21 | 20 | 0 | 0 |
| | | C-2 | 6 | 6 | 17 | 13 | 21 | 13 | 21 | 13 | 0 | 0 |
| | | C-3 | 11 | 11 | 33 | 0 | 0 | 0 | 0 | 0 | 11 | 11 |
| Mass ratio (A-2/A-1) | | | 7.25 | 2.03 | 0.11 | | | | | | | |
| Content of amino-modified silicone [parts by mass] | | | 1 | — | 20 | — | — | — | — | — | — | — |
| Adhesion amount of oil agent [% by mass] | | | 1.4 | 1.2 | 0.9 | 1.2 | 1.1 | 1.5 | 1.4 | 1.3 | 1.3 | 1.5 |
| Adhesion amount of amino-modified silicone [% by mass] | | | 0.01 | 0.00 | 0.09 | 0.05 | 0.11 | 0.07 | 0.14 | 0.07 | 0.00 | 1.35 |
| Adhesion amount of aromatic ester compounds (A-1 + A-2) [% by mass] | | | 1.13 | 0.98 | 0.45 | 0.42 | 0.67 | 0.53 | 0.85 | 0.00 | 0.00 | 0.00 |
| Ratio of adhesion amounts (A-2/A-1) | | | 7.25 | 2.03 | 0.11 | — | — | — | — | — | — | — |
| Evaluation | Operability | | A | C | A | A | C | B | C | B | C | A |
| | Flameproofing bundlability [mm] | | 25 | 24 | 21 | 21 | 20 | 25 | 24 | 27 | 28 | 20 |
| | Amount of scattered Si [mg/kg] | | 20 | 0 | 110 | 60 | 90 | 60 | 100 | 60 | 0 | 1050 |
| | Number of fusions between single fibers | | A | B | A | B | B | B | B | B | B | A |
| | Strand strength [GPa] | | 4.7 | 3.8 | 4.8 | 4.4 | 4.5 | 4.7 | 4.6 | 4.0 | 3.5 | 5.1 |

In Tables 1 to 3, the term "content of amino-modified silicone" refers to the quantity relative to 100 parts by mass representing the total quantities of the aromatic ester compound (A-1) and the aromatic ester compound (A-2).

As is evident in Tables 1 and 2, the adhesion amount of the oil agent in each Example was appropriate. Moreover, the operability of the process for manufacturing a carbon-fiber-precursor acrylic fiber bundle with an oil composition adhering thereto was satisfactory.

In addition, the bundlability after the flameproofing step in each Example was satisfactory, i.e., 19 to 23 mm. Furthermore, the amount of scattered Si in the flameproofing step was small, and the operability in the calcination step was satisfactory.

The carbon fiber bundle obtained in each Example was substantially free from fusion between single fibers, showed a high value for strand strength, and was excellent in mechanical properties.

Although the amount of scattered Si in the flameproofing step was relatively large in Examples 3, 5, 9, and 12 compared to the other Examples, the amount was not so large as to cause a problem in industrial continuous operation.

On the other hand, with respect to Comparative Examples 1 and 3, in which polyoxyethylene bisphenol A dilaurate (A-1) and tri-isodecyl trimellitate (A-2) were mixed and used, Comparative Example 1, in which the mass ratio of A-1 and A-2 was 7.25, i.e., the content of A-2 was extremely high, and Comparative Example 3, in which the mass ratio of A-1 and A-2 was 0.11, i.e., the quantity of A-1 contained was larger than that of A-2 contained, showed results that were equal to those of the examples with respect to operability, flameproofing bundlability, amount of scattered Si, and the number of fusions but showed results that were inferior to those of the examples with respect to the value of strand strength.

In Comparative Example 2, in which proper quantities of polyoxyethylene bisphenol A dilaurate (A-1) and tri-isodecyl trimellitate (A-2) were blended, but the oil composition did not contain an amino-modified silicone, the operability was inferior to those in the examples: A single yarn was entwined around the conveying roll several times during a 24-hours continuous operation for a carbon-fiber-precursor acrylic fiber bundle with an oil composition adhering thereto. In addition, the number of fusions in the obtained carbon fiber bundle was large, and the value of strand strength was lower than those in the examples.

In Comparative Example 4, in which polyoxyethylene bisphenol A dilaurate (A-1) and pentaerythritol tetrastearate (A-3) were used as the aromatic ester components, the operability, flameproofing bundlability, and the amount of scattered Si were equal to those in the examples, but with respect to the carbon fiber bundle, the number of fusions was large, and the strand strength was not satisfactory.

In Comparative Example 5, in which only polyoxyethylene bisphenol A dilaurate (A-1) was used as the aromatic ester component, and an amino-modified silicone (B-4) having side chains of primary amine and primary, secondary amine and having a viscosity of 10000 mm$^2$/s and an amino equivalent of 7000 g/mol was used as the amino-modified silicone, the operability was markedly low: a single yarn was entwined around the conveying roll a large number of times during a 24-hours continuous operation for a carbon-fiber-precursor acrylic fiber bundle with an oil composition adhering thereto. In addition, the number of fusions in the obtained carbon fiber bundle was large, and the strand strength was not satisfactory.

In Comparative Example 6, in which tri-isodecyl trimellitate (A-2) and pentaerythritol tetrastearate (A-3) were used as the aromatic ester components, the operability was inferior to those in the examples: A single yarn was entwined around the conveying roll several times during a 24-hours continuous operation for a carbon-fiber-precursor acrylic fiber bundle with an oil composition adhering thereto. In addition, the number of fusions in the obtained carbon fiber bundle was large, and the value of strand strength was lower than those in the examples.

In Comparative Example 7, in which only tri-isodecyl trimellitate (A-2) was used as the aromatic ester component, and an amino-modified silicone (B-4) having side chains of primary amine and primary, secondary amine and having a viscosity of 10000 mm$^2$/s and an amino equivalent of 7000 g/mol was used as the amino-modified silicone, the operability was low, there was fusion in the obtained carbon fiber bundle, and the value of strand strength was lower than those in the examples.

In Comparative Example 8, in which only pentaerythritol tetrastearate (A-3) was used as the aromatic ester component, the operability was slightly low despite the fact that the adhesion amount of the oil agent was appropriate, and a single yarn was entwined around the conveying roll several times during a 24-hours continuous operation for a carbon-fiber-precursor acrylic fiber bundle with an oil composition adhering thereto. In addition, the flameproofing bundlability was low, and there were a large number of fusions in the obtained carbon fiber bundle, and the strand strength was lower than in the examples.

In Comparative Example 9, in which only pentaerythritol tetrastearate (A-3) was used as the aromatic ester component, and the oil composition did not contain an amino-modified silicone or a PO/EO block copolymerization polyether, the amount of scattered Si in the flameproofing step was substantially absent because the oil composition did not contain an amino-modified silicone. However, the results of evaluation were extremely inferior to those of the examples with respect to all of the other endpoints.

In Comparative Example 10, in which the oil composition did not contain any aromatic ester component and contained an amino-modified silicone, the operability, the flameproofing bundlability, the number of fusions, and the strand strength were equal to those in the examples, but the amount of scattered Si was extremely large and interfered with industrial continuous calcination.

Test Examples 1 to 5

An oil agent was prepared in the same manner as Example 1, except that the types and loadings of the components constituting the oil composition were changed as shown in Table 4, and 3 parts by mass of an antioxidant (a mixture of tetrakis[methylene-3-(3,5-di-t-butyl-4-hydroxyphenyl)propionate]methane and ditridecyl thiodipropionate; mass ratio, 2:1) was dispersed in the amino-modified silicone in advance, the aromatic esters and surfactants were added with stirring, water is added to the mixture for emulsification to form an oil composition dispersion, and 4 parts by mass of an antistatic agent (oleyl dimethyl ethyl ammonium ethosulfate) was dispersed.

Using the obtained oil agent, a carbon-fiber-precursor acrylic fiber bundle with an oil composition adhering thereto and a carbon fiber bundle were manufactured, and the strand strength of the carbon fiber bundle was measured in the same manner as Example 1, except that changes were made in such a manner that the value of the adhesion amount of the oil agent was as shown in Table 4. The results are shown in Table 4.

Test Examples 2 to 4 belong to the category of the examples, and Test Example 1 and 5 belong to the category of the Comparative Examples.

TABLE 4

| | | | Test Example | | | | |
| --- | --- | --- | --- | --- | --- | --- | --- |
| | | | 1 | 2 | 3 | 4 | 5 |
| Proportion of the Components of Oil Composition | Aromatic ester compound [parts by mass] | A-1 | 27 | 27 | 27 | 27 | 27 |
| | | A-2 | 60 | 60 | 60 | 60 | 60 |
| | Amino-modified silicone [parts by mass] | B-1 | 13 | 13 | 13 | 13 | 13 |
| | Surfactant [parts by mass] | C-1 | 13 | 13 | 13 | 13 | 13 |
| | | C-2 | 13 | 13 | 13 | 13 | 13 |

TABLE 4-continued

|  | Test Example | | | | |
|---|---|---|---|---|---|
|  | 1 | 2 | 3 | 4 | 5 |
| Antistatic agent [parts by mass] | 4 | 4 | 4 | 4 | 4 |
| Antioxidant [parts by mass] | 3 | 3 | 3 | 3 | 3 |
| Mass ratio (A-2/A-1) | 2.22 | 2.22 | 2.22 | 2.22 | 2.22 |
| Content of amino-modified silicone [parts by mass] | 15 | 15 | 15 | 15 | 15 |
| Adhesion amount of oil agent [% by mass] | 0.4 | 0.7 | 1.0 | 1.3 | 2.2 |
| Adhesion amount of amino-modified silicone [% by mass] | 0.04 | 0.07 | 0.10 | 0.13 | 0.22 |
| Adhesion amount of aromatic ester compounds (A-1 + A-2) [% by mass] | 0.26 | 0.46 | 0.65 | 0.85 | 1.44 |
| Ratio of adhesion amounts (A-2/A-1) | 2.22 | 2.22 | 2.22 | 2.22 | 2.22 |
| Strand strength [GPa] | 3.9 | 4.9 | 5.1 | 5.1 | 4.8 |

In Table 4, the term "content of amino-modified silicone" refers to the quantity relative to 100 parts by mass representing the total quantities of the aromatic ester compound (A-1) and the aromatic ester compound (A-2).

As is evident in Table 4, the carbon fiber bundles obtained in Test Examples 2 to 4 showed higher strand strength than the carbon fiber bundles obtained in Test Examples 1 and 5 and were more excellent in mechanical properties.

Particularly in Test Example 1, in which the total adhesion amount of polyoxyethylene bisphenol A dilaurate (A-1) and tri-isodecyl trimellitate (A-2) is 0.26% by mass, the value of the strand strength of the carbon fiber bundle was lower than in the other Test Examples.

INDUSTRIAL APPLICABILITY

The oil composition for carbon-fiber-precursor acrylic fiber according to the present invention can effectively suppress fusion between single fibers in the calcination step. Furthermore, by the use of the oil composition of the present invention, the decrease in operability that occurs when an oil composition containing a silicone as the main component is used can be suppressed, and a carbon-fiber-precursor acrylic fiber bundle with an oil composition adhering thereto that has good bundlability can be obtained. From the carbon-fiber-precursor acrylic fiber bundle with an oil composition adhering thereto, a carbon fiber bundle having excellent mechanical properties can be manufactured with good productivity.

The carbon fiber bundle obtained from the carbon-fiber-precursor acrylic fiber bundle to which the oil composition of the present invention is adhered can be formed into a prepreg, which can then be molded into a composite material. The composite materials in which the carbon fiber bundle is used can be suitably used as a useful material in sporting applications, such as a golf shaft and a fishing rod, as a structural material in motor vehicle and aerospace applications, and in various gas storage tank applications.

The invention claimed is:

1. A carbon-fiber-precursor acrylic fiber bundle with an oil composition adhering thereto, wherein:

the oil composition comprises an amino-modified silicone, an aromatic ester compound (1) having a structure of formula (1):

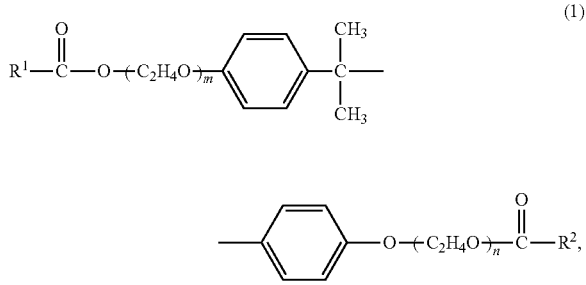

and an aromatic ester compound (2) having a structure of formula (2):

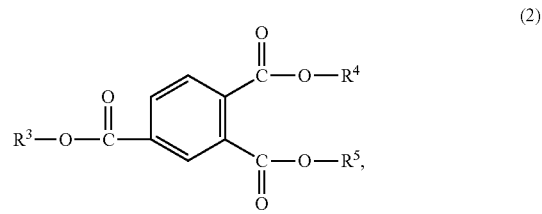

an adhesion amount of the amino-modified silicone is from 0.01 to 0.2% by mass relative to a mass of the dry fiber, a total adhesion amount of the aromatic ester compound (1) and the aromatic ester compound (2) is from 0.4 to 1.2% by mass relative to the mass of the dry fiber, a ratio of the adhesion amounts of the aromatic ester compound (2) to the aromatic ester compound (1) is from 0.25 to 6.5, $R^1$ and $R^2$ are each independently a hydrocarbon group having 7 to 21 carbon atoms, m and n are each independently an integer of from 1 to 5, and $R^3$, $R^4$, and $R^5$ are each independently a hydrocarbon group having 8 to 10 carbon atoms.

2. The fiber bundle according to claim 1, wherein the amino-modified silicone is an amino-modified silicone having a structure of formula (3):

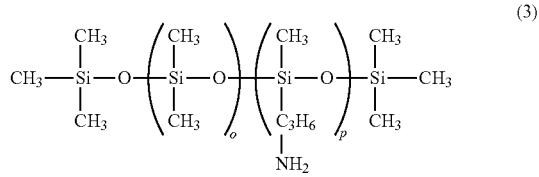

(3)

wherein o is an integer of from 5 to 300, and p is an integer of from 1 to 5.

3. The fiber bundle according to claim 1, wherein the amino-modified silicone has a kinematic viscosity of from 50 to 500 mm²/s at 25° C.

4. The fiber bundle according to claim 1, wherein a block copolymerization polyether comprising a propylene oxide unit and an ethylene oxide unit and having a structure of formula (4):

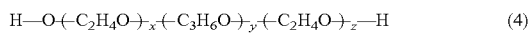

(4)

is further adhered in a quantity of from 5 to 70 parts by mass relative to 100 parts by mass representing a total adhesion amount of the aromatic ester compound (1), the aromatic ester compound (2), and the amino-modified silicone to the dry fiber, wherein x, y, and z are each independently an integer of from 1 to 200.

5. The fiber bundle according to claim 1, wherein the amino-modified silicone has a kinematic viscosity of from 50 to 300 mm²/s at 25° C.

6. An oil composition comprising an amino-modified silicone, an aromatic ester compound (1) having a structure of formula (1):

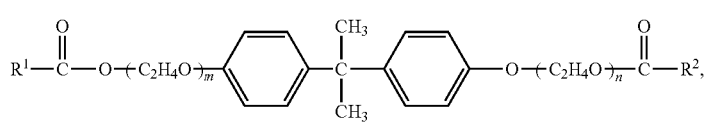

(1)

and an aromatic ester compound (2) having a structure of formula (2):

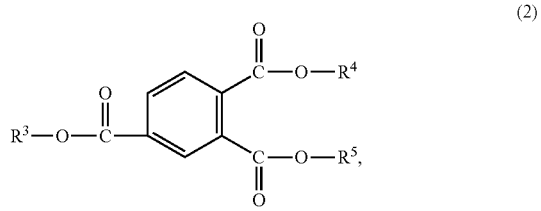

(2)

wherein:
a content of the amino-modified silicone is from 1 to 25 parts by mass relative to 100 parts by mass of a total quantity of the aromatic ester compound (1) and the aromatic ester compound (2), and
a mass ratio of the aromatic ester compound (2) to the aromatic ester compound (1) is from 0.25 to 6.5,
$R^1$ and $R^2$ are each independently a hydrocarbon group having 7 to 21 carbon atoms, m and n are each independently an integer of from 1 to 5, and $R^3$, $R^4$, and $R^5$ are each independently a hydrocarbon group having 8 to 10 carbon atoms.

7. The oil composition according to claim 6, wherein the amino-modified silicone is an amino-modified silicone having a structure of formula (3):

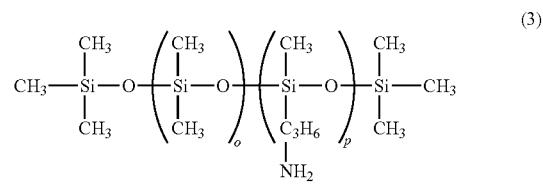

(3)

wherein o is an integer of from 5 to 300, and p is an integer of from 1 to 5.

8. The oil composition according to claim 6, wherein the amino-modified silicone has a kinematic viscosity of from 50 to 500 mm²/s at 25° C.

9. The oil composition according to claim 6, further comprising a block copolymerization polyether comprising a propylene oxide unit and an ethylene oxide unit and having a structure of formula (4):

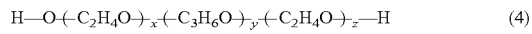

(4)

in a quantity of from 10 to 50 parts by mass relative to 100 parts by mass of a total quantity of the amino-modified silicone, the aromatic ester compound (1), and the aromatic ester compound (2), wherein x, y, and z are each independently an integer of from 1 to 200.

10. An oil composition dispersion, wherein the oil composition according to claim 6 is dispersed in water or a solvent.

11. The oil composition dispersion according to claim 10, wherein the oil composition forms micelles with an average particle size of from 0.01 to 0.50 μm.

12. A process for producing a carbon-fiber-precursor acrylic fiber bundle with an oil composition adhering thereto, comprising:

applying an oil composition dispersion obtained by dispersing the oil composition according to claim 6 in water or a solvent, forming micelles with an average particle size of from 0.01 to 0.50, to a carbon-fiber-precursor acrylic fiber bundle in a water-swelled state, and performing drying densification of the carbon-fiber-precursor acrylic fiber bundle.

13. The oil composition according to claim 6, wherein the amino-modified silicone has a kinematic viscosity of from 50 to 300 mm²/s at 25° C.

* * * * *